(12) United States Patent
Cai

(10) Patent No.: US 11,489,972 B2
(45) Date of Patent: Nov. 1, 2022

(54) METHOD FOR PRESENTING VIDEO ON ELECTRONIC DEVICE WHEN THERE IS INCOMING CALL AND ELECTRONIC DEVICE

(71) Applicant: Huawei Technologies Co., Ltd., Shenzhen (CN)

(72) Inventor: Wendi Cai, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/335,836

(22) Filed: Jun. 1, 2021

(65) Prior Publication Data

US 2021/0289075 A1    Sep. 16, 2021

Related U.S. Application Data

(63) Continuation of application No. PCT/CN2020/072678, filed on Jan. 17, 2020.

(30) Foreign Application Priority Data

Feb. 3, 2019  (CN) .......................... 201910108885.X

(51) Int. Cl.
*H04M 19/04* (2006.01)
*H04M 1/72403* (2021.01)
*H04M 1/57* (2006.01)

(52) U.S. Cl.
CPC ......... *H04M 19/041* (2013.01); *H04M 1/576* (2013.01); *H04M 1/72403* (2021.01)

(58) Field of Classification Search
CPC . H04M 19/041; H04M 1/72403; H04M 1/576
See application file for complete search history.

(56) References Cited

U.S. PATENT DOCUMENTS

| 7,747,290 B1 | 6/2010 | Lundy et al. |
| 2007/0207782 A1 | 9/2007 | Tran |

(Continued)

FOREIGN PATENT DOCUMENTS

| CN | 101090539 A | * 12/2007 |
| CN | 101090539 A | 12/2007 |

(Continued)

OTHER PUBLICATIONS

ITU-T H.264 "Series H: Audiovisual and Multimedia Systems, Infrastructure of audiovisual services—Coding of moving video, Advanced video coding for generic audiovisual services," Apr. 2017, 812 pages.

*Primary Examiner* — Yuwen Pan
*Assistant Examiner* — Angelica M Perez
(74) *Attorney, Agent, or Firm* — Conley Rose, P.C.

(57) ABSTRACT

A method includes receiving a first incoming call request, displaying a first incoming call display interface on the screen based on the first incoming call request, playing a first video in the first incoming call display interface, receiving a second incoming call request, displaying a second incoming call display interface on the screen based on the second incoming call request, and playing a second video in the second incoming call display interface, where the first incoming call request and the second incoming call request are two call requests consecutively received by the electronic device, and the first video is different from the second video.

20 Claims, 26 Drawing Sheets

(56) References Cited

U.S. PATENT DOCUMENTS

| | | | |
|---|---|---|---|
| 2010/0004033 A1 | | 1/2010 | Choe et al. |
| 2015/0005041 A1 | * | 1/2015 | Lim ..................... H04M 19/04 455/567 |
| 2015/0163347 A1 | | 6/2015 | Jansson |
| 2016/0269695 A1 | | 9/2016 | Xiao |
| 2021/0289075 A1 | | 9/2021 | Cai |
| 2021/0306450 A1 | | 9/2021 | Chen |

FOREIGN PATENT DOCUMENTS

| | | | | | |
|---|---|---|---|---|---|
| CN | 101119519 A | * | 2/2008 | | |
| CN | 101175195 A | | 5/2008 | | |
| CN | 101321333 A | | 12/2008 | | |
| CN | 105847588 A | | 8/2016 | | |
| CN | 106033247 A | | 10/2016 | | |
| CN | 106254810 A | | 12/2016 | | |
| CN | 108111663 A | | 6/2018 | | |
| CN | 109119101 A | | 1/2019 | | |
| CN | 106412347 B | * | 3/2019 | ........ | H04M 3/42017 |
| CN | 109743442 A | | 5/2019 | | |
| CN | 109981885 A | | 7/2019 | | |
| JP | 2002222369 A | | 8/2002 | | |
| JP | 2003189361 A | | 7/2003 | | |
| JP | 2006091680 A | | 4/2006 | | |
| JP | 2006121335 A | | 5/2006 | | |

\* cited by examiner

1100

Receive a first incoming call request — S1110

Display a first caller ID display interface on the screen based on the first incoming call request, and play a first video in the first caller ID display interface — S1120

Receive a second incoming call request — S1130

Display a second caller ID display interface on the screen based on the second incoming call request, and play the second video in the second caller ID display interface, where the first incoming call request and the second incoming call request are two call requests consecutively received by the electronic device, and the first video is different from the second video — S1140

FIG. 11

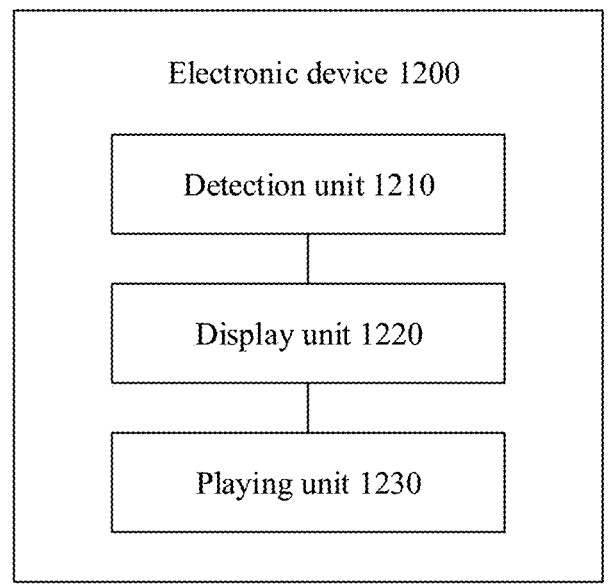

FIG. 12

METHOD FOR PRESENTING VIDEO ON ELECTRONIC DEVICE WHEN THERE IS INCOMING CALL AND ELECTRONIC DEVICE

CROSS-REFERENCE TO RELATED APPLICATIONS

This application is a continuation of International Patent Application No. PCT/CN2020/072678 filed on Jan. 17, 2020, which claims priority to Chinese Patent Application No. 201910108885.X filed on Feb. 3, 2019. The disclosures of the aforementioned applications are hereby incorporated by reference in their entireties.

TECHNICAL FIELD

This application relates to the field of electronic devices, and in particular, to a method for presenting a video on an electronic device when there is an incoming call and an electronic device.

BACKGROUND

A mobile phone terminal can play only a ringtone when there is an incoming call. Because an incoming call is a high-frequency scenario of the mobile phone terminal, a user may answer incoming calls for a plurality of times every day. However, the mobile phone terminal plays a same phone ringtone each time, which cannot bring freshness to the user. Consequently, user experience is relatively poor when there is an incoming call for the user.

SUMMARY

This application provides a method for presenting a video on an electronic device when there is an incoming call and an electronic device, to improve user experience when there is an incoming call.

According to a first aspect, a method for presenting a video on an electronic device when there is an incoming call is provided. The electronic device includes a screen. The method includes the following. The electronic device receives a first incoming call request, the electronic device displays a first incoming call display interface on the screen based on the first incoming call request, and plays a first video in the first incoming call display interface, the electronic device receives a second incoming call request, and the electronic device displays a second incoming call display interface on the screen based on the second incoming call request, and plays a second video in the second incoming call display interface, where the first incoming call request and the second incoming call request are two call requests consecutively received by the electronic device, and the first video is different from the second video.

According to the method, provided in this embodiment of this application, for presenting a video on an electronic device when there is an incoming call, a user is allowed to select a plurality of incoming call videos, and video content that is different from video content displayed when a previous incoming call is received may be displayed each time an incoming call is received, thereby bringing good experience to the user.

In some possible implementations, the first video and the second video may be locally stored in the electronic device in advance. Alternatively, the first video and the second video may be obtained after a request is sent to a network in real time when an incoming call request is received.

For example, in the future, the electronic device may be served by a $5^{th}$ generation mobile communications network (5G), and a transmission speed of the 5G may reach tens of gigabits (Gb) per second (s). When receiving an incoming call request, the electronic device may request, from the network in real time, an incoming call video to be played in an incoming call display interface, and a delay of the incoming call video is very small, almost negligible, and does not affect user experience.

In some possible implementations, the method further includes the following. The electronic device requests a plurality of videos from a server, where the plurality of videos include the first video and the second video, and the electronic device receives the plurality of videos sent by the server.

According to the method, in this embodiment of this application, for presenting a video on an electronic device when there is an incoming call, the user is allowed to select a video theme, the video theme may include a plurality of videos, and video content that is different from video content displayed when a previous incoming call is received may be displayed each time an incoming call is received, thereby bringing good experience to the user.

With reference to the first aspect, in some possible implementations of the first aspect, before playing the second video in the second incoming call display interface, the method further includes the following. The electronic device automatically determines the second video that needs to be played in the second incoming call display interface.

According to the method, provided in this embodiment of this application, for presenting a video on an electronic device when there is an incoming call, the electronic device can automatically switch video content between two consecutive incoming calls without a manual operation of the user. This helps improve user experience.

It should be understood that "automatic switching" in this embodiment of this application is not an action of switching to another video in a process of playing a video by the electronic device. In other words, "automatic switching" is not an action in a process of continuously playing videos. Instead, it should be understood as that after an incoming call request is received, the electronic device plays the first video, and then the video disappears from the screen after the call ends, and after an incoming call request is received next time, a played incoming call video automatically changes to the second video.

In some possible implementations, a time point at which the electronic device automatically determines the second video that needs to be played in the second incoming call display interface may be a time point at which the electronic device requests the first video and the second video from the server, or may be a time point at which the electronic device detects, in the first incoming call display interface, an operation of answering or hanging up an incoming call by the user, or may be a time point at which the electronic device receives a second incoming call request.

With reference to the first aspect, in some possible implementations of the first aspect, the method further includes the following. The electronic device receives a setting instruction of the user, where the setting instruction is used to specify a range of video content played in an incoming call display interface, and the electronic device determines the first video and the second video based on the range specified by the setting instruction.

According to the method, provided in this embodiment of this application, for presenting a video on an electronic device when there is an incoming call, the electronic device determines the range of the video content played in the incoming call display interface, to help the electronic device timely play a video in the range.

In some possible implementations, the range of the video content played in the incoming call display interface may be videos stored in a first storage path of the electronic device.

In some possible implementations, the range of the video content played in the incoming call display interface may be videos having label information (which may alternatively be referred to as a theme or a type).

With reference to the first aspect, in some possible implementations of the first aspect, at least a first subscriber identity module card and a second subscriber identity module card may be installed in the electronic device. The configuration instruction includes a first configuration instruction and a second configuration instruction. The first configuration instruction is used to specify a range of a video played in an incoming call display interface corresponding to an incoming call of the first subscriber identity module card. The second configuration instruction is used to specify a range of a video played in an incoming call display interface corresponding to an incoming call of the first subscriber identity module card.

According to the method, provided in this embodiment of this application, for presenting a video on an electronic device when there is an incoming call, different incoming call videos may be set for different subscriber identity module cards. This helps improve user experience when there is an incoming call.

With reference to the first aspect, in some possible implementations of the first aspect, at least a first subscriber identity module card and a second subscriber identity module card may be installed in the electronic device. That the first incoming call request and the second incoming call request are two call requests consecutively received by the electronic device means that the first incoming call request and the second incoming call request are two call requests of the first subscriber identity module card. Alternatively, that the first incoming call request and the second incoming call request are two call requests consecutively received by the electronic device means that the first incoming call request and the second incoming call request are two consecutive call requests of the second subscriber identity module card.

In some possible implementations, when the first incoming call request and the second incoming call request are two call requests of the first subscriber identity module card, different videos in a first video theme are played in an incoming call display interface of the electronic device, and when the first incoming call request and the second incoming call request are two consecutive call requests of the second subscriber identity module card, different videos in a second video theme are played in an incoming call display interface of the electronic device. The first video theme is different from the second video theme.

According to the method, provided in this embodiment of this application, for presenting a video on an electronic device when there is an incoming call, for a same subscriber identity module card, when receiving an incoming call request at different time points, the electronic device may play, in an incoming call display interface, different videos in a same video theme, and for another subscriber identity module card, when receiving an incoming call request at different time points, the electronic device may play, in an incoming call display interface, different videos in another video theme. This helps improve user experience when there is an incoming call.

With reference to the first aspect, in some possible implementations of the first aspect, before the receiving a first incoming call request, the method further includes the following. The electronic device detects a first operation of the user when the first video is played or a file of the first video is displayed, and the electronic device sets, in response to the first operation, the first video as a candidate video to be played in an incoming call display interface.

According to the method, provided in this embodiment of this application, for presenting a video on an electronic device when there is an incoming call, when the user is watching a video or a video file is being displayed, the user may set the currently watched video or the displayed video file as an incoming call video, so that the user can timely adjust an incoming call video that the user expects to watch. This helps improve user experience.

With reference to the first aspect, in some possible implementations of the first aspect, before the receiving a first incoming call request, the method further includes the following. The electronic device detects a first operation of the user when a third video is played or a file of the third video is displayed, the electronic device displays a setting interface for the third video in response to the first operation, the electronic device detects a selection operation of the user, where the selection operation is used to select a partial video clip in the third video, and the electronic device determines the partial video clip in the third video as the first video based on the selection operation, and sets the first video as a candidate video to be played in an incoming call display interface.

According to the method, provided in this embodiment of this application, for presenting a video on an electronic device when there is an incoming call, when the user watches a video or it is shown that duration of a video file is excessively long, the electronic device may remind the user to perform video clipping, so that the user watches a video clip that the user prefers when there is an incoming call. This helps improve user experience.

In some possible implementations, when the electronic device determines that duration of a current video or a current video file is greater than or equal to a first duration threshold, the electronic device prompts the user to perform a video clipping operation.

With reference to the first aspect, in some possible implementations of the first aspect, before the receiving a first incoming call request, the method further includes the following. The electronic device adjusts definition of the first video.

According to the method, provided in this embodiment of this application, for presenting a video on an electronic device when there is an incoming call, when definition of a video selected by the user does not meet a definition requirement of playing a video in an incoming call display interface, the electronic device may automatically update the definition of the video, so that the user can timely watch a video that the user likes when there is an incoming call. This helps improve user experience.

With reference to the first aspect, in some possible implementations of the first aspect, when the first video is played in the first incoming call display interface, the method further includes detecting a second operation of the user, and displaying, by the electronic device, a first control in the first incoming call display interface in response to the second operation, where the first control is used by the user to add the first video to favorites, give a like to the first video, or forward the first video.

With reference to the first aspect, in some possible implementations of the first aspect, the first incoming call display interface and the second incoming call display interface each further display an answering user interface (UI) control and a hang-up UI control. When the answering UI control is triggered, the electronic device answers an incoming call, and when the hang-up UI control is triggered, the electronic device hangs up an incoming call.

In some possible implementations, when the electronic device detects that the user triggers the answering UI control or the hang-up UI control, video content in an incoming call display interface automatically disappears.

According to a second aspect, this technical solution provides an apparatus for presenting a video on an electronic device when there is an incoming call. The apparatus is included in the electronic device, and has a function of implementing an action of the electronic device in the foregoing aspects and possible implementations of the foregoing aspects. The function may be implemented by hardware, or may be implemented by hardware executing corresponding software. The hardware or the software includes one or more modules or units corresponding to the foregoing function, for example, a detection module or unit, a display module or unit, and a play module or unit.

According to a third aspect, this technical solution provides an electronic device, including a screen, one or more processors, a memory, a plurality of applications, and one or more computer programs. The one or more computer programs are stored in the memory, and the one or more computer programs include instructions. When the instructions are executed by the electronic device, the electronic device is enabled to perform the method for presenting a video on an electronic device when there is an incoming call in any possible implementation of any one of the foregoing aspects.

According to a fourth aspect, this technical solution provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the method for presenting a video on an electronic device when there is an incoming call in any possible implementation of any one of the foregoing aspects.

According to a fifth aspect, this technical solution provides a computer storage medium, including computer instructions. When the computer instructions are run on an electronic device, the electronic device is enabled to perform the method for presenting a video on an electronic device when there is an incoming call in any possible implementation of any one of the foregoing aspects.

According to a sixth aspect, this technical solution provides a computer program product. When the computer program product runs on an electronic device, the electronic device is enabled to perform the method for presenting a video on an electronic device when there is an incoming call in any possible design of any one of the foregoing aspects.

BRIEF DESCRIPTION OF DRAWINGS

FIG. 11 is another schematic flowchart of a method for presenting a video on an electronic device when there is an incoming call according to an embodiment of this application; and FIG. 12 is a schematic block diagram of an electronic device according to an embodiment of this application.

DESCRIPTION OF EMBODIMENTS

The following describes the technical solutions in the embodiments of this application with reference to the accompanying drawings in the embodiments of this application. In descriptions of the embodiments of this application, "I" means "or" unless otherwise specified. For example, AB may represent A or B. In this specification, "and/or" describes only an association for describing associated objects and represents that three relationships may exist. For example, A and/or B may represent the following three cases: only A exists, both A and B exist, and only B exists. In addition, in the descriptions in the embodiments of this application, "a plurality of" means two or more than two.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more than two.

The method provided in the embodiments of this application may be applied to an electronic device, for example, a mobile phone, a tablet computer, a wearable device, a vehicle-mounted device, an augmented reality (AR) device/a virtual reality (VR) device, a notebook computer, an ultra-mobile personal computer (UMPC), a netbook, or a personal digital assistant (PDA). A specific type of the electronic device is not limited in the embodiments of this application.

Figure 1:
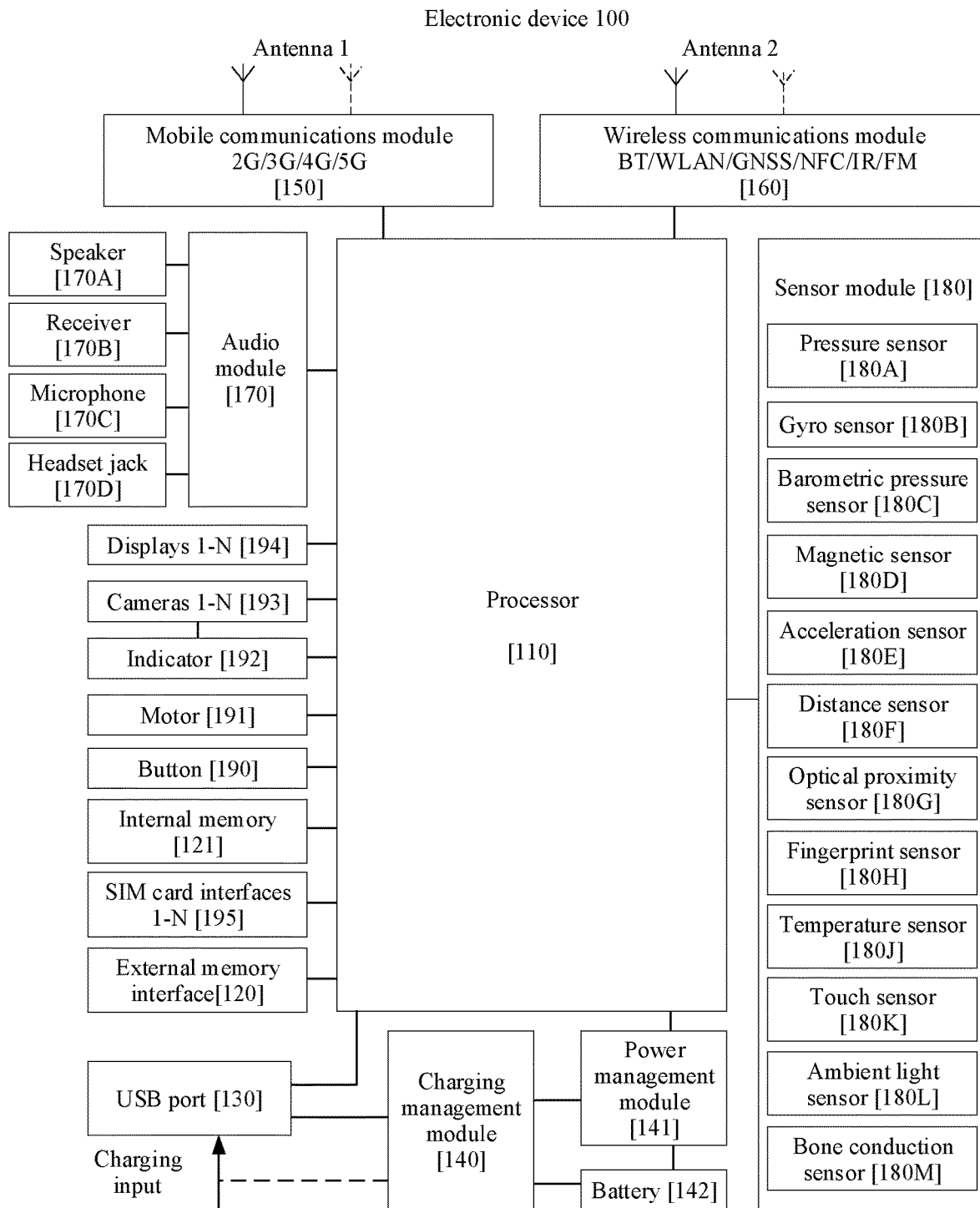
FIG. 1 is a schematic diagram of a hardware structure of an electronic device according to an embodiment of this application.

For example, FIG. 1 is a schematic diagram of a structure of an electronic device 100. The electronic device 100 may include a processor 110, an external memory interface 120, an internal memory 121, a Universal Serial Bus (USB) port 130, a charging management module 140, a power management unit 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of this application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

The memory may further be disposed in the processor 110, and is configured to store an instruction and data. In some embodiments, the memory in the processor 110 is a cache. The memory may store an instruction or data just used or cyclically used by the processor 110. If the processor 110 needs to use the instruction or the data again, the processor 110 may directly invoke the instruction or the data from the memory. This avoids repeated access and reduces a waiting time of the processor 110, thereby improving system efficiency.

In some embodiments, the processor 110 may include one or more interfaces. The interface may include an Inter-Integrated Circuit (I2C) interface, an I2C sound (I2S) interface, a pulse-code modulation (PCM) interface, a universal asynchronous receiver/transmitter (UART) interface, a Mobile Industry Processor Interface (MIPI), a general-purpose input/output (GPIO) interface, a SIM interface, a USB port, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a BLUETOOTH headset.

The PCM interface may also be used for audio communication, to sample, quantize, and encode an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a BLUETOOTH headset. Both the I2S interface and the PCM interface may be used for audio communication.

The UART interface is a universal serial data bus, and is used for asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a BLUETOOTH module in the wireless communications module 160 through the UART interface, to implement a BLUETOOTH function. In some embodiments, the audio module 170 may transmit an audio signal to the wireless communications module 160 through the UART interface, to implement a function of playing music by using a BLUETOOTH headset.

The MIPI interface may be configured to connect the processor 110 to peripheral devices such as the display 194 and the camera 193. The MIPI interface includes a Camera Serial Interface (CSI), a Display Serial Interface (DSI), and the like. In some embodiments, the processor 110 communicates with the camera 193 through the CSI interface, to implement a shooting function of the electronic device 100. The processor 110 communicates with the display 194 through the DSI interface, to implement a display function of the electronic device 100.

The GPIO interface may be configured by using software. The GPIO interface may be configured as a control signal interface or a data signal interface. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB port 130 is an interface that complies with a USB standard specification, and may be a mini USB port, a micro USB port, a USB Type-C port, or the like. The USB port 130 may be configured to connect to the charger to charge the electronic device 100, or may be used for data transmission between the electronic device 100 and a peripheral device, or may be configured to connect to a headset, to play audio by using the headset. Alternatively, the port may be configured to connect to another electronic device, for example, an AR device.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection manner different from an interface connection manner in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input by using a wireless charging coil of the electronic device 100. The charging management module 140 supplies power to the electronic device by using the power management unit 141 while charging the battery 142.

The power management unit 141 is configured to connect to the battery 142, the charging management module 140, and the processor 110. The power management unit 141 receives an input from the battery 142 and/or the charging management module 140, and supplies power to the processor 110, the internal memory 121, an external memory, the display 194, the camera 193, the wireless communications module 160, and the like. The power management unit 141 may further be configured to monitor parameters such as a battery capacity, a battery cycle count, and a battery health status (electric leakage or impedance). In some other embodiments, the power management unit 141 may alternatively be disposed in the processor 110. In some other embodiments, the power management unit 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further be multiplexed to improve antenna utilization. For example, the antenna 1 may be multiplexed as a diversity antenna of a wireless local area network. In some other embodiments, the antenna may be used in combination with a tuning switch.

The mobile communications module 150 can provide a solution, applied to the electronic device 100, to wireless communication including $2^{nd}$ generation mobile communications network (2G)/$3^{rd}$ generation mobile communications network (3G)/$4^{th}$ generation mobile communications network (4G)/5G and the like. The mobile communications module 150 may include at least one filter, a switch, a power amplifier, a low noise amplifier (LNA), and the like. The mobile communications module 150 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation by using the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (which is not limited to the speaker 170A, the receiver 170B, or the like), or displays an image or a video through the display 194.

In some embodiments, the modem processor may be an independent component. In some other embodiments, the modem processor may be independent of the processor 110, and is disposed in a same device as the mobile communications module 150 or another function module.

The wireless communications module 160 may provide wireless communication solutions that are applied to the electronic device 100, for example, wireless local area network (WLAN) (such as a WI-FI), BLUETOOTH (BT), global navigation satellite system (GNSS), frequency modulation (FM), Near-Field Communication (NFC), and infrared (IR) technologies. The wireless communications module 160 may be one or more devices that integrate at least one communications processing module. The wireless communications module 160 receives an electromagnetic wave by using the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, the antenna 1 of the electronic device 100 is coupled to the mobile communications module 150, and the antenna 2 is coupled to the wireless communications module 160, so that the electronic device 100 can communicate with a network and another device by using a wireless communications technology. The wireless communications technology may include a Global System for Mobile Communications (GSM), a General Packet Radio Service (GPRS), code-division multiple access (CDMA), wideband CDMA (WCDMA), time-division-synchronous CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or satellite based augmentation systems (SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may use a liquid-crystal display (LCD), an organic light-emitting diode (LED) (OLED), an active-matrix OLED (AMOLED), a flex LED (FLED), a miniled, a microled, a micro-OLED, a quantum dot LED (QLED), or the like. In some embodiments, the electronic device 100 may include one or N displays 194, where N is a positive integer greater than 1.

The electronic device 100 can implement the shooting function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a red, green, and blue (RGB) format, a YUV format, or the like. In some embodiments, the electronic device 100 may include one or N cameras 193, where N is a positive integer greater than 1.

The digital signal processor is configured to process a digital signal, and may further process another digital signal in addition to a digital image signal. For example, when the electronic device 100 selects a frequency, the digital signal processor is configured to perform Fourier transform and the like on frequency energy.

The video codec is configured to compress or decompress a digital video. The electronic device 100 may support one or more types of video codecs. In this way, the electronic device 100 can play or record videos in a plurality of encoding formats, for example, Moving Picture Experts Group (MPEG)-1, MPEG-2, MPEG-3, MPEG-4, and the like.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the electronic device 100, for example, image recognition, facial recognition, speech recognition, and text understanding, can be implemented by using the NPU.

The external memory interface 120 may be configured to connect to an external storage card, for example, a micro Secure Digital (SD) card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instruction stored in the internal memory 121, to perform various function applications and data processing of the electronic device 100. The internal memory 121 may include a program storage area and a data storage area. The program storage area may store an operating system, an application required by at least one function (for example, a sound playing function or an image playing function), and the like. The data storage area may store data (such as audio data and an address book) created during use of the electronic device 100, and the like. In addition, the internal memory 121 may include a high-speed random-access memory (RAM), and may further include a nonvolatile memory, for example, at least one magnetic disk storage device, a flash memory device, or a Universal Flash Storage (UFS).

The electronic device 100 may implement audio functions, for example, music playback and recording, by using the audio module 170, the speaker 170A, the receiver 170B, the microphone 170C, the headset jack 170D, the application processor, and the like.

The audio module 170 is configured to convert digital audio information into an analog audio signal output, and is further configured to convert an analog audio input into a digital audio signal. The audio module 170 may further be configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When a call is answered or voice information is received by using the electronic device 100, the receiver 170B may be put close to a human ear to receive a voice.

The microphone 170C, also referred to as a "mike" or a "voice tube", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal and reduce noise. The microphones may further identify a sound source, to implement a directional recording function, and the like.

The headset jack 170D is configured to connect to a wired headset. The headset jack 170D may be the USB port 130 or a 3.5-millimeter (mm) Open Mobile Terminal Platform (OMTP) standard interface or a cellular telecommunications industry association of the United States of America (USA) (CTIA) standard interface.

The pressure sensor 180A is configured to sense a pressure signal, and can convert the pressure signal into an electrical signal. In some embodiments, the pressure sensor 180A may be disposed on the display 194. There is a plurality of types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a change of the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensities may correspond to different operation instructions.

For example, when a touch operation whose touch operation intensity is less than a first pressure threshold is performed on a short message service (SMS) message application icon, an instruction for viewing an SMS message is executed. When a touch operation whose touch operation intensity is greater than or equal to the first pressure threshold is performed on the SMS message application icon, an instruction for creating an SMS message is executed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to perform image stabilization during photographing. For example, when the shutter is pressed, the gyro sensor 180B detects an angle at which the electronic device 100 shakes, and calculates, based on the angle, a distance for which a lens module needs to compensate, so that the lens cancels the shake of the electronic device 100 through reverse motion, to implement image stabilization. The gyro sensor 180B may further be used in navigation and motion sensing game scenarios.

The barometric pressure sensor 180C is configured to measure barometric pressure. In some embodiments, the electronic device 100 calculates a sea level height based on the barometric pressure measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover by using the magnetic sensor 180D. Further, based on a detected opening or closing state of the leather case or a detected opening or closing state of the flip cover, features such as automatic unlocking of the flip cover are set.

The acceleration sensor 180E may detect accelerations in various directions (usually on three axes) of the electronic device 100, and may detect magnitude and a direction of gravity when the electronic device 100 is still. The acceleration sensor 180E may further be configured to identify a posture of the electronic device, and is applied to switching between a landscape mode and a portrait mode, and applications such as a pedometer.

The distance sensor 180F is configured to measure a distance. The electronic device 100 may measure a distance by using infrared or laser. In some embodiments, in a shooting scenario, the electronic device 100 may measure a distance by using the distance sensor 180F, to implement fast focusing.

The optical proximity sensor 180G may include an LED and an optical detector, for example, a photodiode. The light-emitting diode may be an infrared LED. The electronic device 100 emits infrared light by using the LED. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be configured to automatically unlock and lock the screen in a leather case mode and a pocket mode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint-based unlocking, application access locking, fingerprint-based photographing, fingerprint-based call answering, and the like by using a feature of the collected fingerprint.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is lower than another threshold, the electronic device 100 heats the battery 142, to avoid an abnormal shutdown of the electronic device 100 caused by a low temperature. In some other embodiments, when the temperature is lower than still another threshold, the electronic device 100 boosts an output voltage of the battery 142, to avoid an abnormal shutdown caused by a low temperature.

The touch sensor 180K is also referred to as a "touch panel". The touch sensor 180K may be disposed in the display 194, and the touch sensor 180K and the display 194 form a touchscreen, which is also referred to as a "touch control screen". The touch sensor 180K is configured to detect a touch operation performed on or near the touch sensor 180K. The touch sensor may transfer the detected touch operation to the application processor, to determine a type of a touch event. A visual output related to the touch operation may be provided by using the display 194. In some other embodiments, the touch sensor 180K may alternatively be disposed on a surface of the electronic device 100, and is located at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be inserted into the same SIM card interface 195 at the same time. The plurality of cards may be of a same type or of different types. The SIM card interface 195 may also be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an embedded SIM (eSIM) card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In an embodiment of this application, an ANDROID system with a layered architecture is used as an example to describe a software structure of the electronic device 100.

Figure 2:
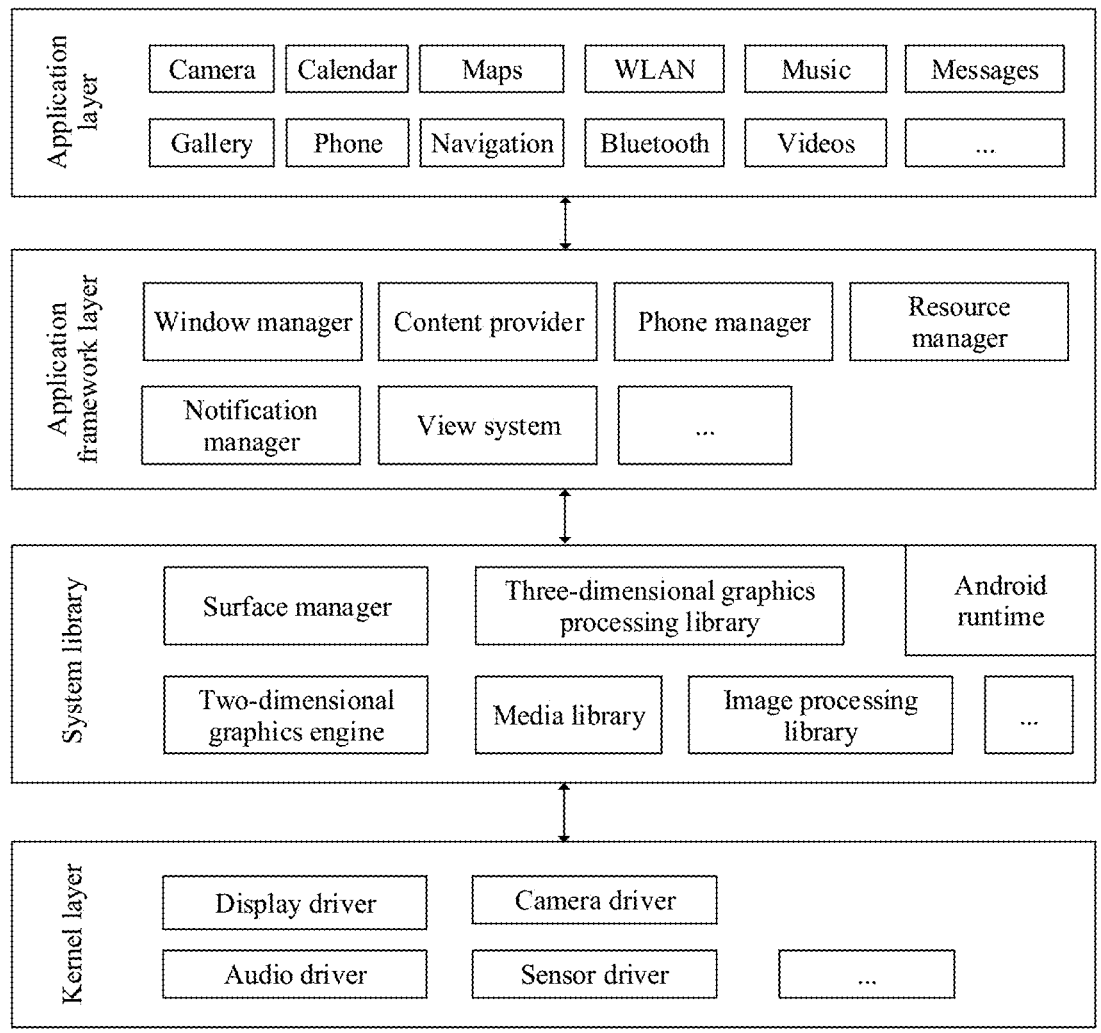
FIG. 2 is a schematic diagram of a software structure of an electronic device according to an embodiment of this application.

FIG. 2 is a block diagram of the software structure of the electronic device 100 according to this embodiment of this application. In the layered architecture, software is divided into several layers, and each layer has a clear role and task. The layers communicate with each other through a software interface. In some embodiments, the ANDROID system is divided into four layers an application layer, an application framework layer, an ANDROID runtime, a system library, and a kernel layer from top to bottom. The application layer may include a series of application packages.

As shown in FIG. 2, the application packages may include applications such as "camera", "gallery", "calendar", "phone", "maps", "navigation", "WLAN", "BLUETOOTH", "music", "videos", and "messages".

The application framework layer provides an application programming interface API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history, a bookmark, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device 100, for example, management of a call status (including answering, declining, or the like).

The resource manager provides various resources for an application, such as a localized character string, an icon, an image, a layout file, and a video file.

The notification manager enables an application to display notification information in the status bar, and may be configured to convey a notification message. The notification manager may automatically disappear after a short pause without requiring a user interaction. For example, the notification manager is configured to notify download completion, give a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, a prompt tone is produced, the electronic device vibrates, or an indicator light blinks.

The ANDROID runtime includes a kernel library and a virtual machine. The ANDROID runtime is responsible for scheduling and management of the ANDROID system.

The core library includes two parts: a function that needs to be called by a JAVA language, and a kernel library of ANDROID.

The application layer and the application framework layer run in the virtual machine. The virtual machine executes java files of the application layer and the application framework layer as binary files. The virtual machine is configured to perform functions such as object lifecycle management, stack management, thread management, security and exception management, and garbage collection.

The system library may include a plurality of function modules, for example, a surface manager, a media library, a three-dimensional (3D) graphics processing library (for example, Open Graphics Library (OpenGL) for Embedded Systems (ES)), and a two-dimensional (2D) graphics engine (for example, SKIA Graphics Library (SGL)).

The surface manager is configured to manage a display subsystem and provide fusion of 2D and 3D image layers for a plurality of applications.

The media library supports playback and recording of a plurality of commonly used audio and video formats, static image files, and the like. The media library may support a plurality of audio and video coding formats, such as MPEG-4, H.264, MPEG-1 Audio Layer III (MP3), Advanced Audio Coding (AAC), Adaptive Multi-Rate (AMR), Joint Photographic Experts Group (JPG), and Portable Network Graphics (PNG).

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Before the technical solution in the embodiments of this application are described, several concepts related to the embodiments of this application are first described.

Short video: A short video, namely a video clip, is a mode of transmission of Internet content, and is generally video transmission content whose duration is within 1 minute transmitted on new media on the Internet. With popularization of mobile terminals and speed-up of networks, short-smooth-fast large-traffic transmission content is gradually favored by various platforms, fans, and capitals.

Mobile phone theme: A mobile phone theme is similar to a theme function of Windows. By downloading a favorite mobile phone theme application, a user can set corresponding content such as a corresponding standby picture, a screen saver, ringtones, an operation interface, and icons at a time, so that the user can personalize a mobile phone more conveniently and quickly. Depending on the theme, the user feels immersive when using the mobile phone, and is no longer merely faced with a fixed mobile phone operation interface, a fixed picture, and a fixed color.

Video incoming call: A video incoming call means that a video is played when there is an incoming call.

FIG. 3A to FIG. 3D show a group of graphical user interfaces (GUI) of a mobile phone.

Figure 3A:
FIG. 3A, FIG. 3B, FIG. 3C, and FIG. 3D are a schematic diagram of a group of display interfaces according to an embodiment of this application.

Referring to a GUI shown in FIG. 3A, the GUI is a desktop 301 of the mobile phone. After detecting that a user taps an icon 302 of a theme application (APP) on the desktop 301, the mobile phone may start the theme application, and display a GUI shown in FIG. 3B.

Figure 3B:
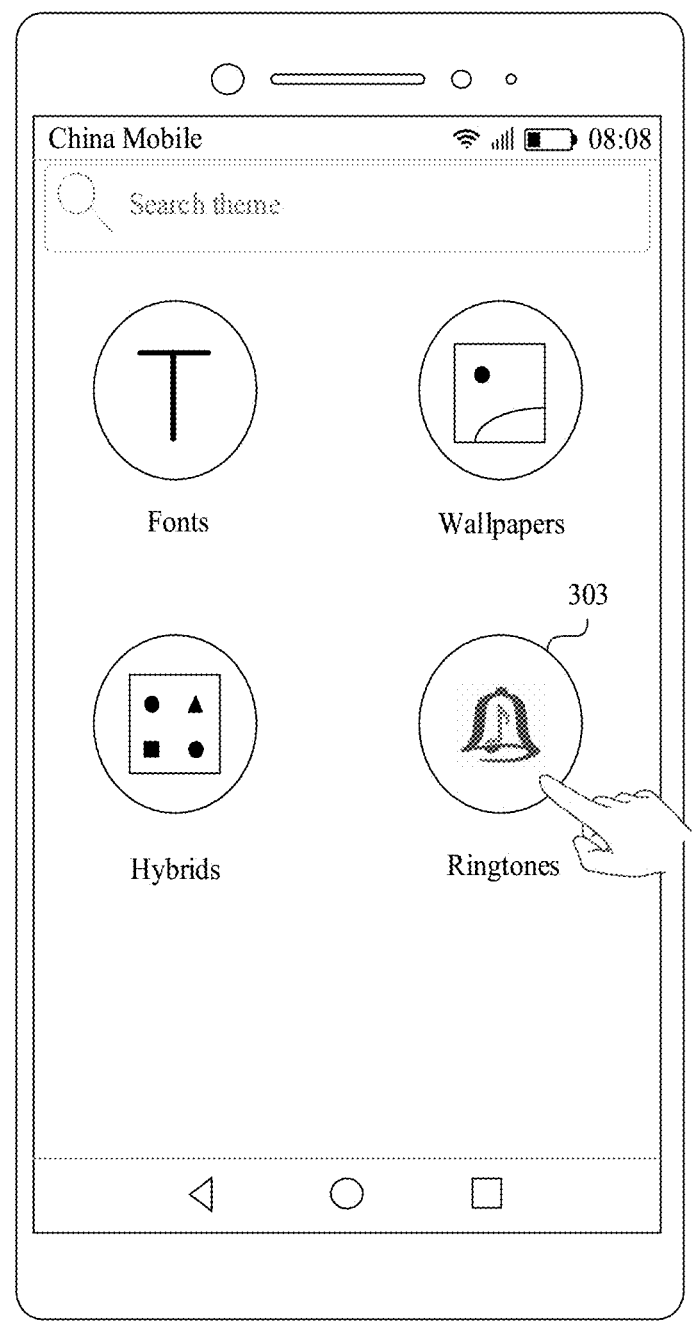

Referring to the GUI shown in FIG. 3B, the theme application includes themes about "fonts", "wallpapers", "hybrids", and "ringtones". After detecting that the user taps a "ringtone" icon 303, the mobile phone displays a GUI shown in FIG. 3C.

Figure 3C:
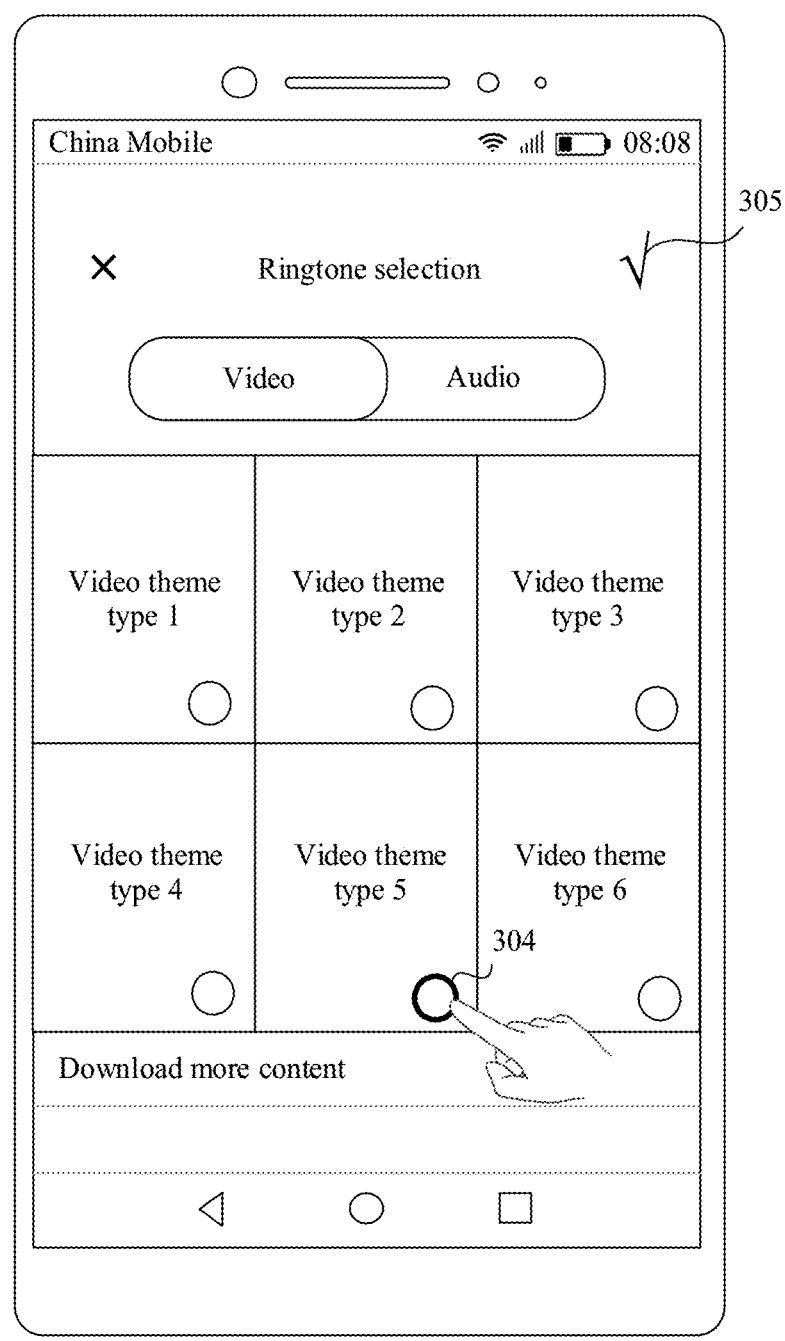

Referring to the GUI shown in FIG. 3C, the "ringtone" includes "audio" and "video", and "video" themes include video theme types 1-6. After detecting that the user selects a control 304 of the video theme type 5 and taps the control 304, the mobile phone loads the video theme type 5 to the mobile phone.

For example, the video theme type 5 may include a plurality of videos with different content.

It should be understood that, after detecting that the user taps the control 304, the mobile phone may request, from an incoming call video server, a plurality of pieces of video content corresponding to the video theme type 5. After the incoming call video server returns the plurality of pieces of corresponding video content, the mobile phone may load the plurality of pieces of video content to the mobile phone.

Figure 3D:
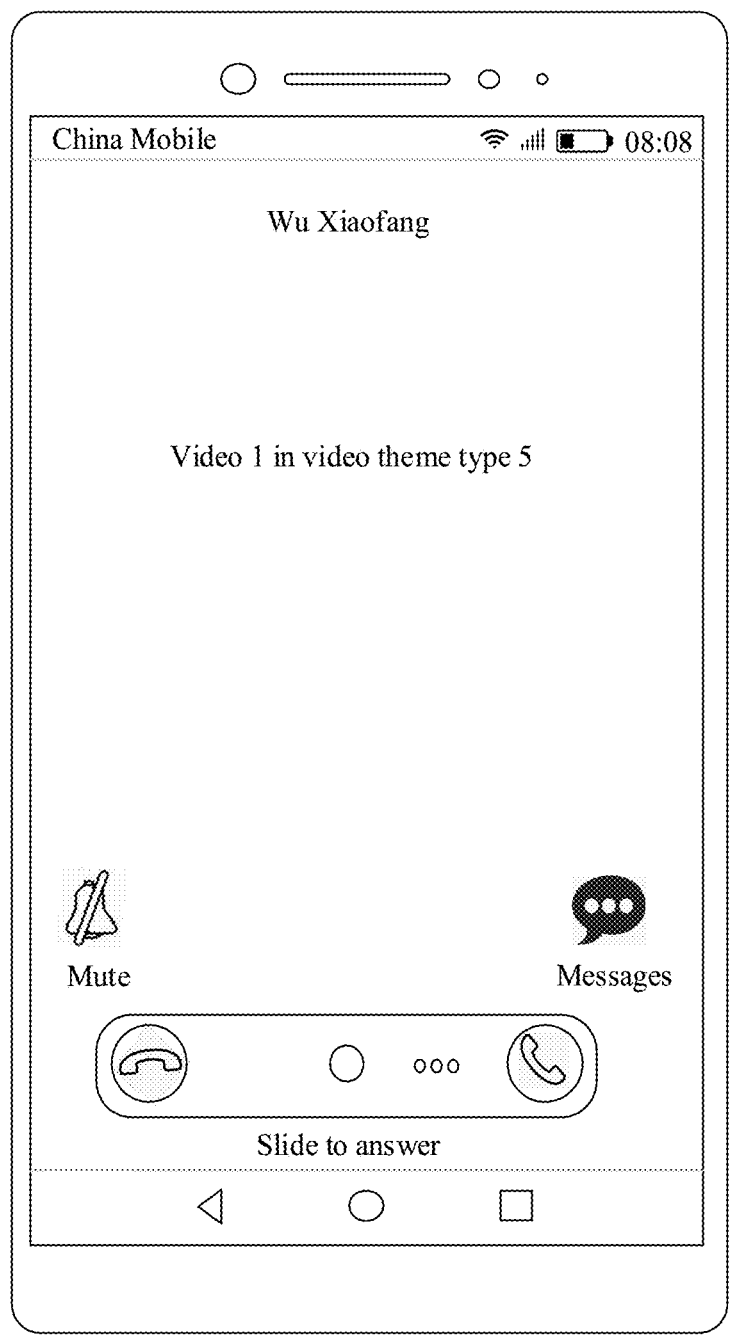

Referring to a GUI shown in FIG. 3D, when there is an incoming call from a user "Wu Xiaofang", a video 1 in the video theme type 5 may be displayed in an incoming call display interface of the mobile phone.

According to the method, in this embodiment of this application, for presenting an incoming call video, the user is allowed to select a video theme and video content that is played each time an incoming call is received, thereby bringing good experience to the user.

Figure 4A:
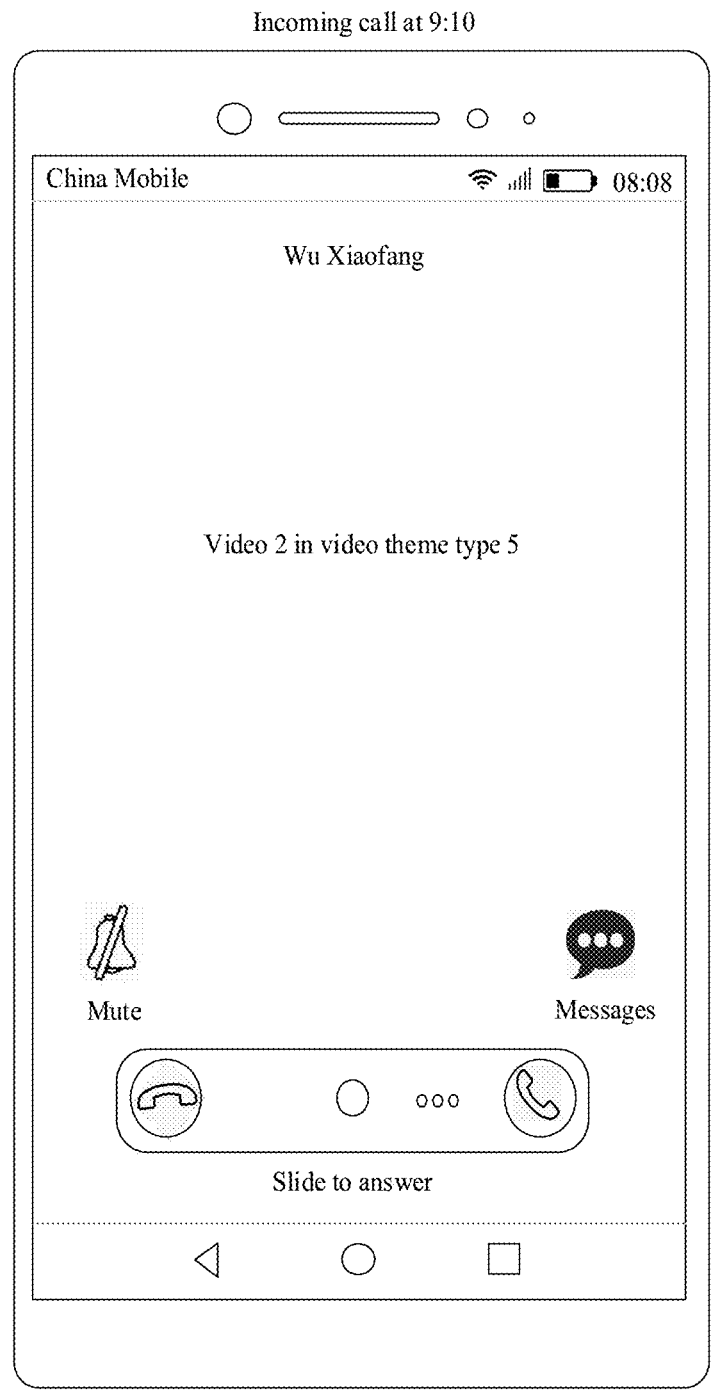
FIG. 4A and FIG. 4B are a schematic diagram of another group of display interfaces according to an embodiment of this application.
Figure 4B:
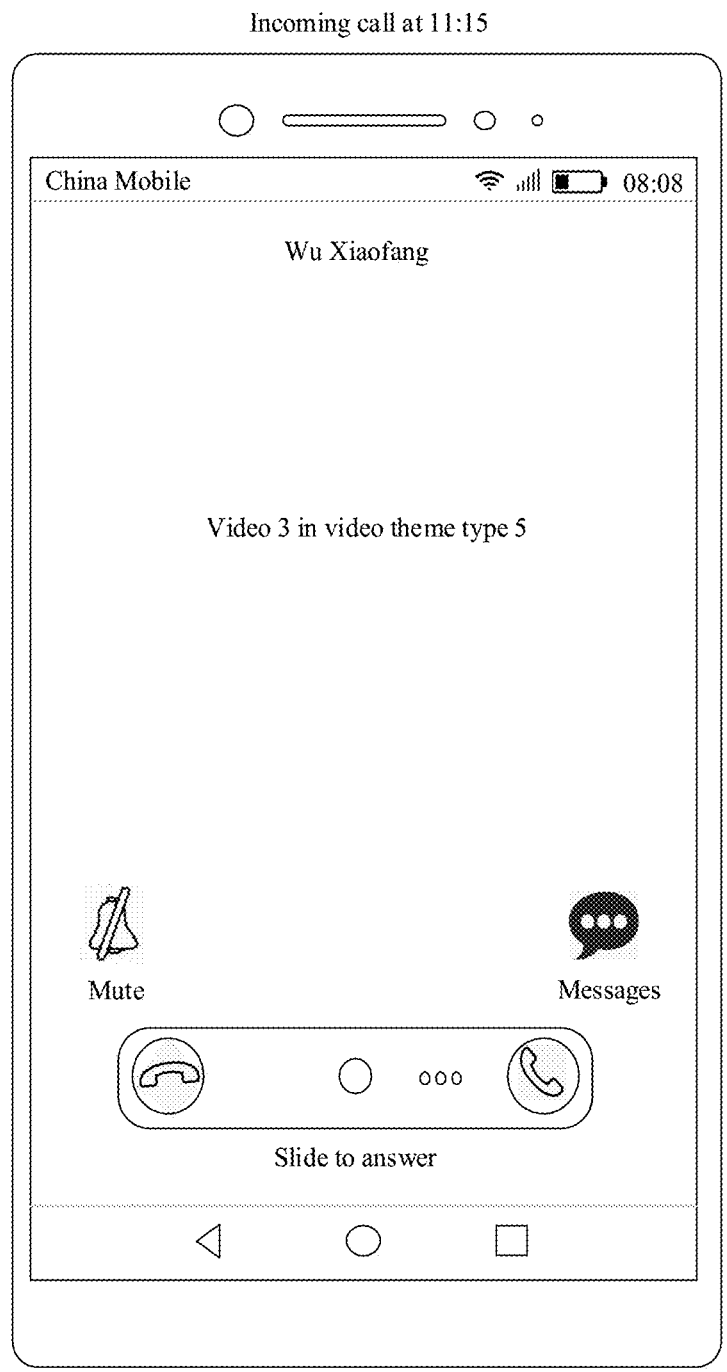

FIG. 4A and FIG. 4B are a schematic diagram of another group of GUIs according to an embodiment of this application.

Referring to a GUI shown in FIG. 4A, when there is an incoming call from a user "Wu Xiaofang" at 9:10, a video 2 in a video theme type 5 is displayed in an incoming call display interface displayed on a display of a mobile phone.

Referring to a GUI shown in FIG. 4B, when there is an incoming call from the user "Wu Xiaofang" at 11:15, a video 3 in the video theme type 5 is displayed in an incoming call display interface displayed on the display of the mobile phone.

In an embodiment, after detecting that a user taps a control 304, the mobile phone may request video information in the video theme type 5 from a corresponding server. The server may send a plurality of videos in the video theme type 5 to the mobile phone. The mobile phone may store the plurality of videos in a folder (for example, the folder may be named as an "incoming call video" folder) in the mobile phone. Each time there is an incoming call from a user, the mobile phone may select a video from the "incoming call video" folder as an incoming call display video.

Optionally, the mobile phone may use a sequence of receiving the plurality of videos from the server as a display sequence of incoming call videos, or the mobile phone may randomly select a video from the "incoming call video" folder as an incoming call video.

In another embodiment, after requesting a plurality of videos in the video theme type 5 from the server, the mobile phone may process the plurality of videos.

For example, the plurality of videos are labeled, and a label of each video may be "video theme type 5". When there is an incoming call from a user, the mobile phone may search for the videos whose labels are "video theme type 5" stored in the mobile phone, and use one of these videos as an incoming call video.

In another embodiment, labels of a plurality of videos downloaded by the mobile phone from the server may be "video theme type 5", and the mobile phone also stores labels, which are also "video theme type 5", of videos that are previously shot or downloaded from another place by the user. In this case, when there is an incoming call from a user, the mobile phone may select a video from all the videos whose labels are "video theme type 5" as an incoming call video.

In another embodiment, after detecting that the user taps the control 304, the mobile phone may not request a plurality of videos in the video theme type 5 from the server in advance. When receiving an incoming call request, the electronic device may request an incoming call video from the server in real time.

For example, at 9:10, while detecting an incoming call from the user "Wu Xiaofang", the mobile phone requests and receives the video 2 sent by the server, and plays the video 2 in the incoming call display interface.

In another embodiment, after detecting that the user taps the control 304, the mobile phone may determine a network address without requesting a plurality of videos in the video theme type 5 from the server. The plurality of videos in the video theme type 5 are stored in the network address. When receiving an incoming call request, the electronic device can request an incoming call video from the server in real time. For example, at 9:10, while detecting an incoming call from the user "Wu Xiaofang", the mobile phone downloads the video 2 from the network address in real time, and plays the video 2 in the incoming call display interface.

It should be understood that a network service enjoyed by a future electronic device may be a 5G or higher-speed network service. A delay from a time point at which the electronic device receives an incoming call request to a time point at which the electronic device requests an incoming call video that needs to be played and plays the video in an incoming call display interface may be ignored, and user experience is not affected.

In an embodiment, the incoming call from the user "Wu Xiaofang" at 9:10 and the incoming call from the user "Wu Xiaofang" at 11:15 may be two consecutive incoming calls received by the mobile phone. Alternatively, the two calls may not be two consecutive calls. For example, an incoming call from a user "Zhang Xiaoming" is received at 10:30, and a video 4 in the theme type 5 is displayed on the display of the mobile phone.

Optionally, when the incoming call from the user "Wu Xiaofang" at 9:10 and the incoming call from the user "Wu Xiaofang" at 11:15 are two consecutive incoming calls received by the mobile phone, the mobile phone automatically determines that an incoming call video that needs to be played for the incoming call at 11:15 is the video 3.

For example, the mobile phone downloads, from the server, a plurality of videos (for example, the plurality of videos include a video 1, the video 2, the video 3, and the video 4) corresponding to the video theme type 5, and stores the plurality of videos in a storage path in the mobile phone. When receiving the incoming call from the user "Wu Xiaofang" at 9:10, the mobile phone determines, in the storage path, the video 2 that needs to be played.

When receiving the incoming call from the user "Wu Xiaofang" at 11:15, the mobile phone may automatically determine, from this storage path, the video 3 that needs to be played, or the mobile phone may automatically switch an incoming call video that needs to be played from the video 2 to the video 3 in this storage path.

It should be understood that a time point at which the mobile phone automatically determines an incoming call video at 11:15 may be a time point at which the mobile phone requests a plurality of videos of the "video theme type 5" from the server. The mobile phone may automatically determine a sequence of playing the plurality of videos. For example, the video 1, the video 2, and the video 3 are played based on a sequence of incoming calls. Alternatively, the time point at which the mobile phone automatically determines the incoming call video at 11:15 may be any time point after the mobile phone receives the incoming call at 9:10 and before the mobile phone receives the incoming call at 11:15. Alternatively, the time point at which the mobile phone automatically determines the incoming call video at 11:15 may be a time point at which the mobile phone receives the incoming call from the user at 11:15, and the mobile phone may automatically determine, from the plurality of videos, any video (for example, the video 3) other than the video 2 as the incoming call video that needs to be played. In this embodiment of this application, a time point at which the mobile phone automatically determines the video 3 is not limited.

According to the method, in this embodiment of this application, for presenting a video on an electronic device when there is an incoming call, the user is allowed to select a video theme, the video theme may include a plurality of videos, and video content that is different from video content displayed when a previous incoming call is received may be displayed each time an incoming call is received, thereby bringing good experience to the user.

In an embodiment, when receiving a current incoming call request, the mobile phone may determine video content to be played when a next incoming call is received, and video content to be played in a current incoming call display interface is automatically determined by the mobile phone when a previous incoming call is received. In addition, video content played for each incoming call is different from a video played for the previous incoming call.

In an embodiment, each time the mobile phone receives an incoming call request, the mobile phone may automatically determine the video content to be displayed in the current incoming call display interface, so that the video content played for each incoming call is different from the video played for the previous incoming call.

In an embodiment, after receiving the current incoming call request, the mobile phone may automatically determine, at any time point before receiving a next incoming call request, video content played in an incoming call display interface, so that the video content played for each incoming call is different from the video played for the previous incoming call.

In this specification, both "when an XX event occurs, a YY step is performed" and "after the XX event occurs, the YY step is performed" mean that the YY step is performed based on the occurrence of the XX event, and simultaneity or a sequence of the XX event and the YY step is not strictly limited.

According to the method, in this embodiment of this application, for presenting a video on an electronic device when there is an incoming call, the user is allowed to select a video theme, the video theme may include a plurality of videos, and video content that is different from video content displayed when a previous incoming call is received may be displayed each time an incoming call is received, thereby bringing good experience to the user.

FIG. 5A to FIG. 5D are a schematic diagram of another group of GUIs according to an embodiment of this application.

Figure 5A:
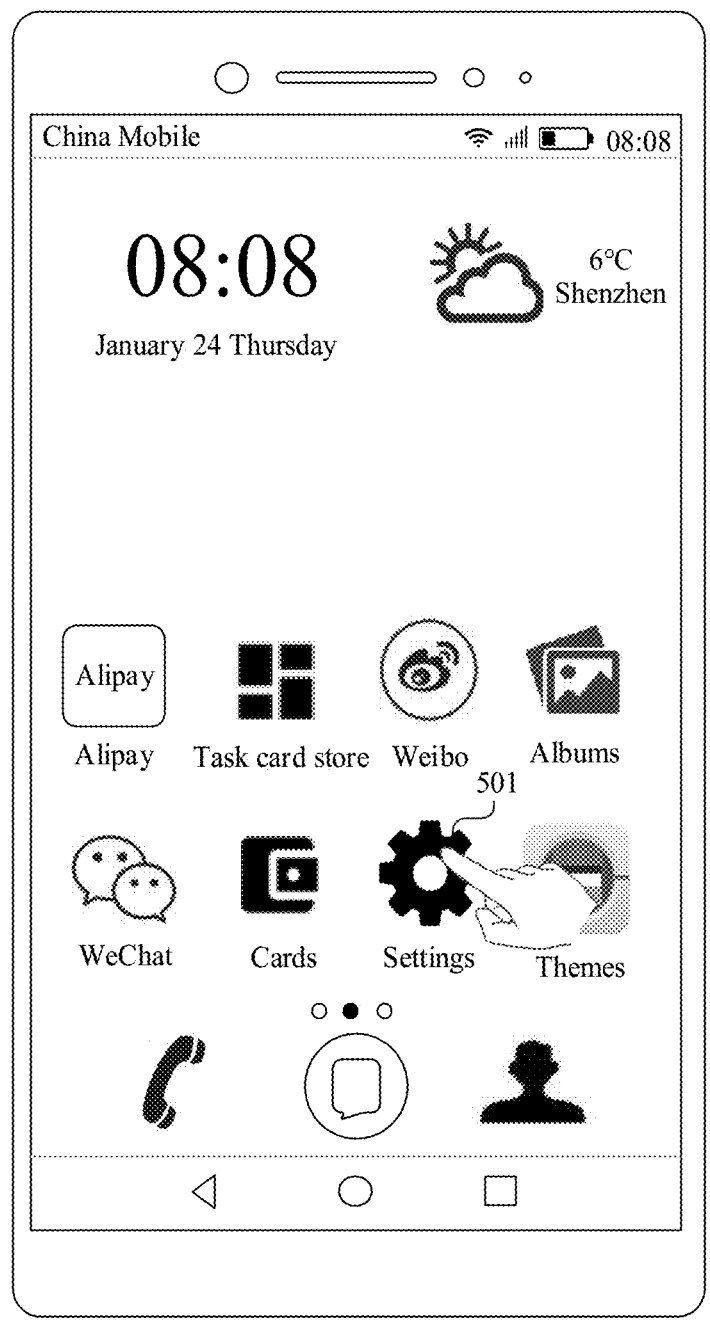
FIG. 5A, FIG. 5B, FIG. 5C, and FIG. 5D are a schematic diagram of another group of display interfaces according to an embodiment of this application.

Referring to a GUI shown in FIG. 5A, the GUI is a desktop of a mobile phone. After detecting that a user taps a "settings" icon 501 on the desktop, the mobile phone displays a GUI shown in FIG. 5B.

Figure 5B:
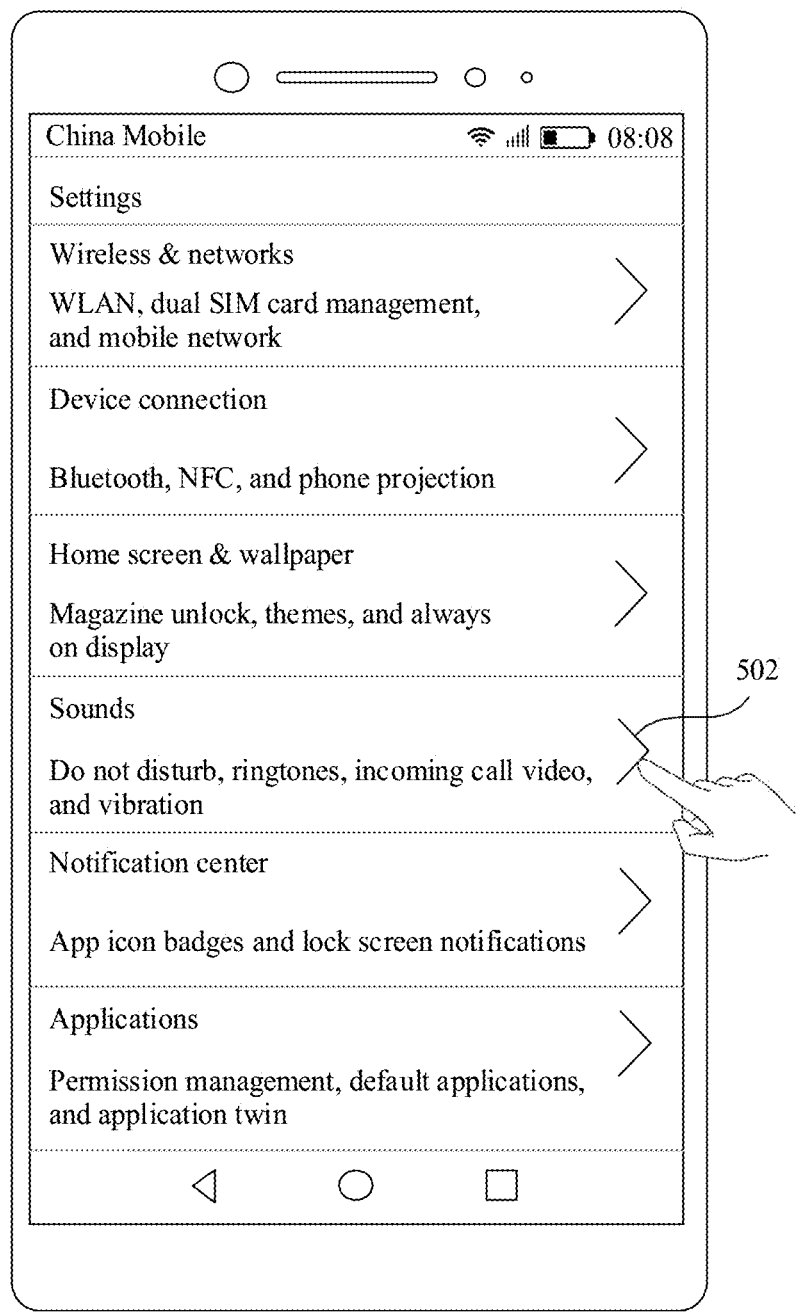

Referring to the GUI shown in FIG. 5B, the GUI is a setting interface of the mobile phone. The user may set wireless & networks, device connection, home screen & wallpaper, sounds, notification center, and applications. In this embodiment of this application, the user may choose to select an incoming call video under sound settings. After detecting that the user taps a control 502 in the setting interface, the mobile phone displays a GUI shown in FIG. 5C.

Figure 5C:
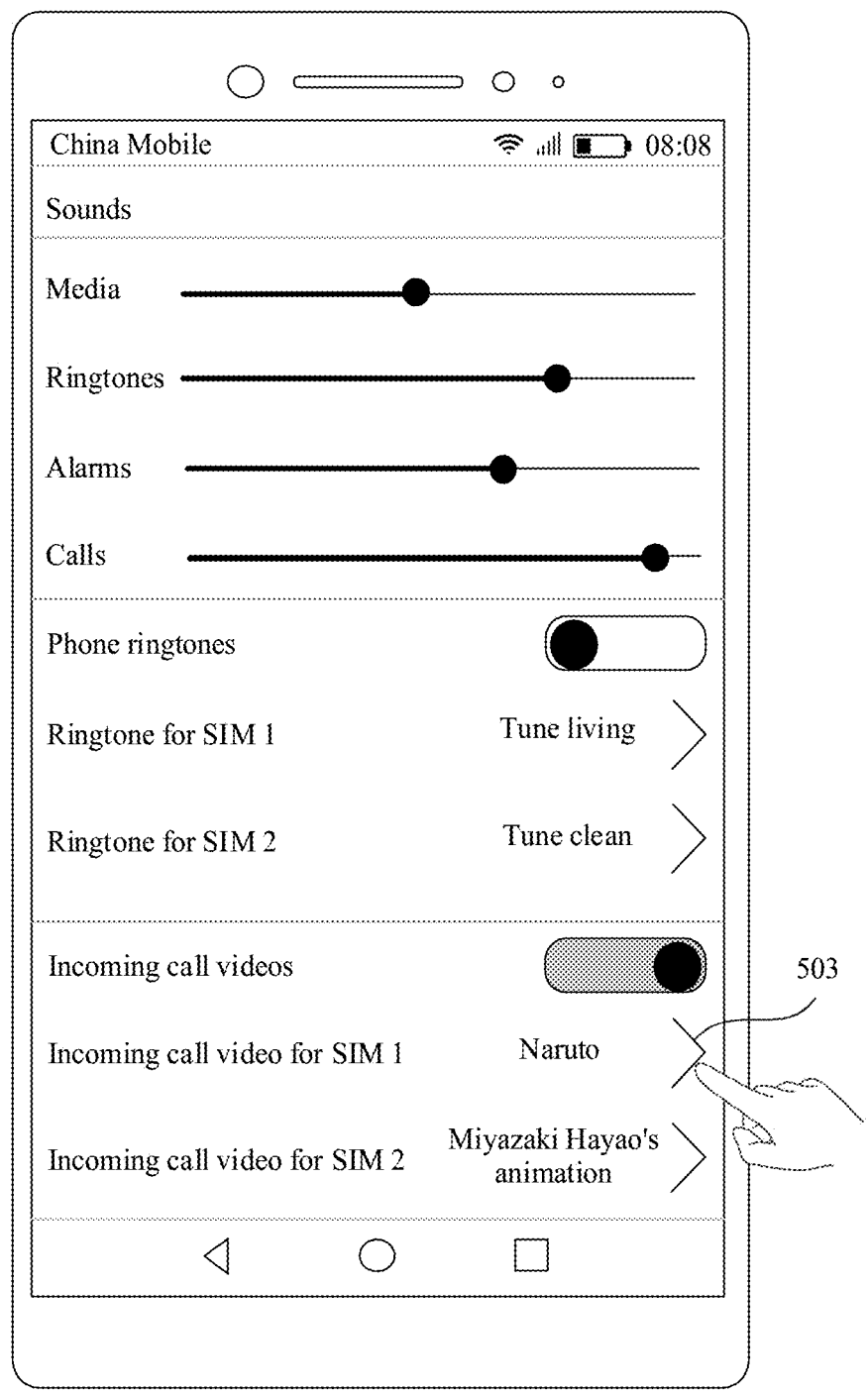

Referring to the GUI shown in FIG. 5C, the GUI is a sound setting interface of the mobile phone, and the user may adjust volumes of media, ringtones, alarms, and calls.

The user may also set phone ringtones in the sound setting interface, including setting whether to enable the phone ringtones and selecting a phone ringtone for each SIM card of the mobile phone. For example, the mobile phone supports two SIM cards (a first SIM card and a second SIM card), and the user may select a phone ringtone for each of the first SIM card and the second SIM card.

The user may also set incoming call videos in the sound setting interface, including setting whether to enable the incoming call videos and selecting an incoming call video for each SIM card of the mobile phone. For example, the mobile phone supports two SIM cards (first SIM card and second SIM card), and the user may select an incoming call video for each of the first SIM card and the second SIM card.

For example, referring to the GUI shown in FIG. 5C, the incoming call video of the current first SIM card is "Naruto". When detecting that the user taps a control 503, the mobile phone displays a GUI shown in FIG. 5D.

In an embodiment, the incoming call video "Naruto" of the first SIM card may be a theme type of an incoming call video that is previously loaded by the user from a theme application.

In another embodiment, the incoming call video "Naruto" of the first SIM card may also be a video that is previously set by the user and that is in a "Naruto" category in an album of the mobile phone. The "Naruto" category may include one or more videos related to "Naruto".

In an embodiment, when the first SIM card of the user detects an incoming call for two consecutive times, different videos in a "Naruto" theme type may be respectively displayed in two incoming call display interfaces of the two times.

In another embodiment, when the second SIM card of the user detects an incoming call for two consecutive times, different videos in a "Miyazaki Hayao's animation" theme type may be displayed in two incoming call display interfaces of the two times.

In another embodiment, when the first SIM card of the user receives an incoming call, a video in the "Naruto" theme type may be displayed in an incoming call display interface. When the second SIM card of the user receives an incoming call, a video in the "Miyazaki Hayao's animation" theme type can be displayed in an incoming call display interface.

Figure 5D:
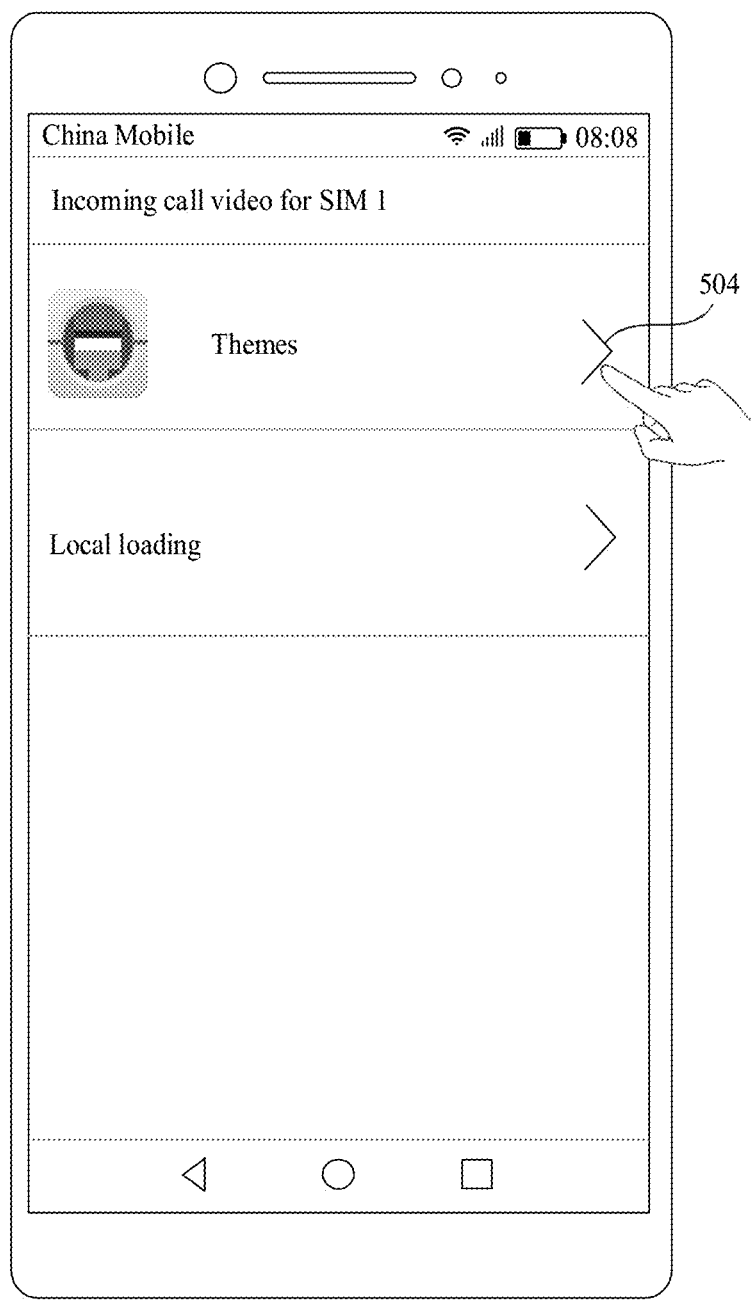

Referring to FIG. 5D, the GUI is a setting interface of the incoming call video of the first SIM card, and the interface includes an entry of a theme application and an entry for local loading. After detecting that the user taps a control 504, the mobile phone may display a GUI as that shown in FIG. 3C. The theme application is displayed for the user to reselect a theme type of an incoming call video that the user likes.

In a possible implementation, after detecting an operation of the user, the mobile phone may use a locally stored video as an incoming call video of the mobile phone.

FIG. 6A to FIG. 6D show another group of GUIs according to an embodiment of this application.

Figure 6A:
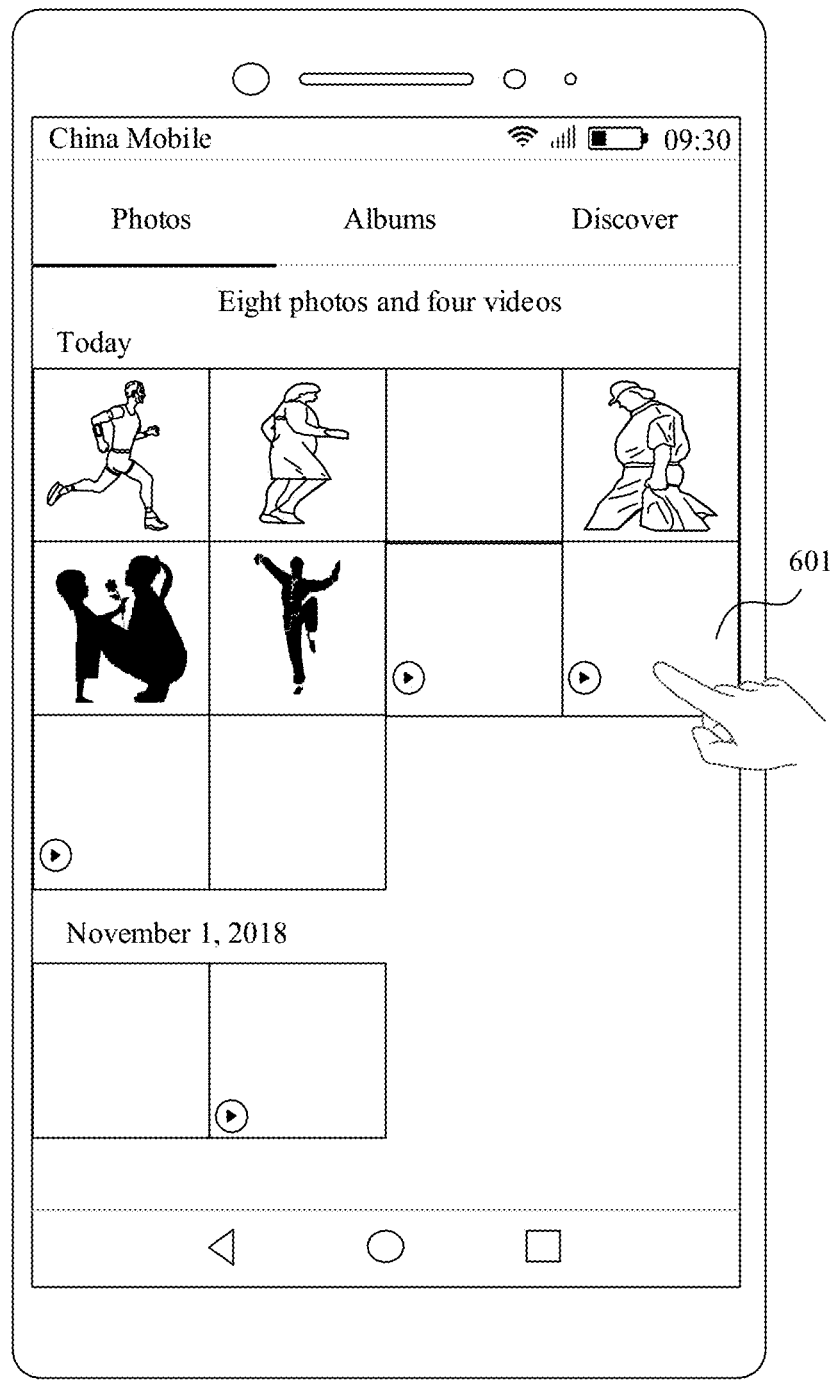
FIG. 6A, FIG. 6B, FIG. 6C, and FIG. 6D are a schematic diagram of another group of display interfaces according to an embodiment of this application.

Referring to a GUI shown in FIG. 6A, the GUI is an album interface of a mobile phone. An album of the mobile phone includes eight photos and four videos. When detecting a preset gesture of a user on a video 601, the mobile phone may display a GUI shown in FIG. 6B.

Figure 6B:
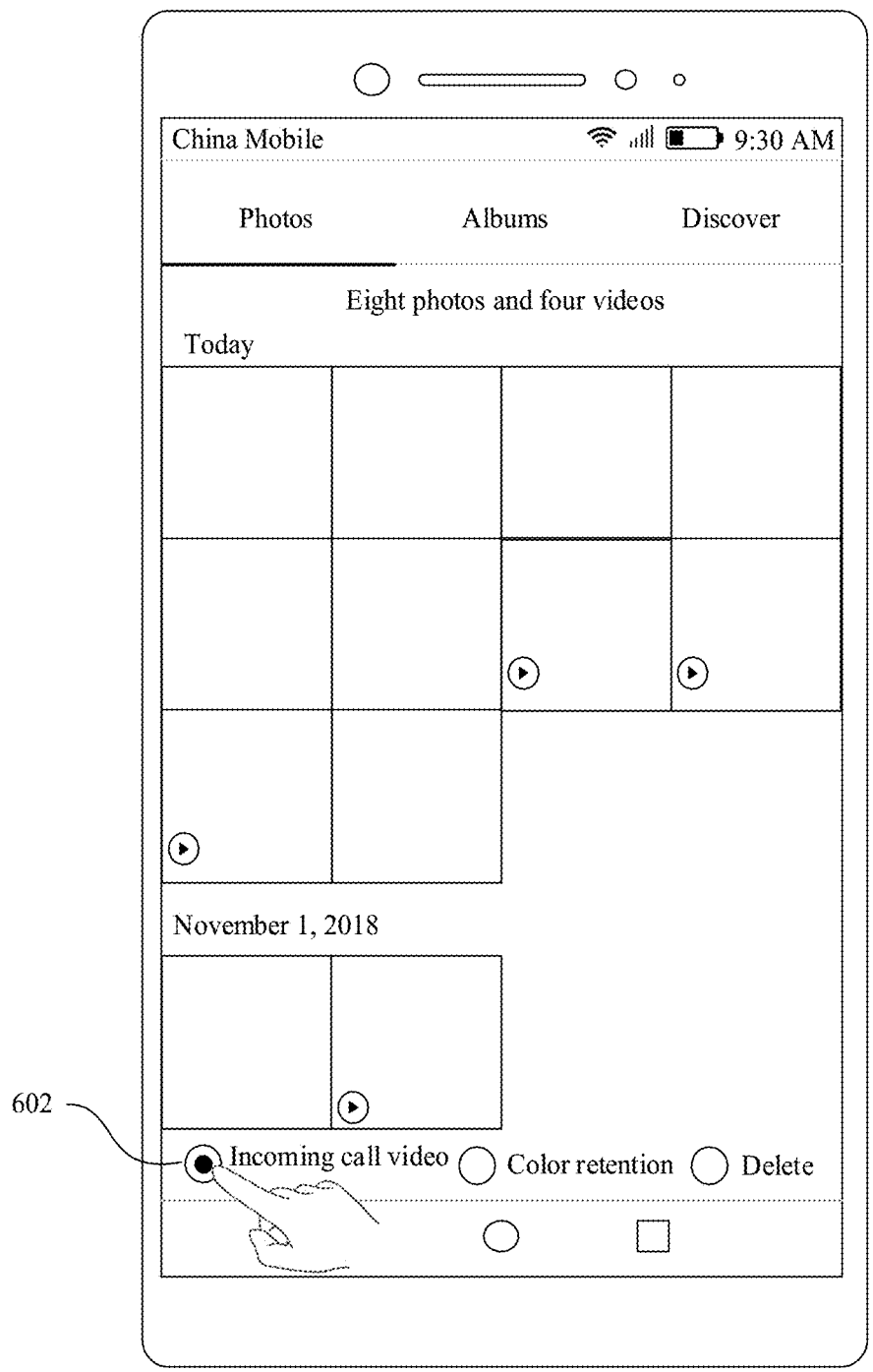

For example, after the mobile phone detects that the user touches and holds on the video 601 in the album interface, the GUI shown in FIG. 6B is displayed.

For another example, after the mobile phone detects that the user presses the video 601 in the album interface (for example, a pressing force is greater than or equal to a preset value), the GUI shown in FIG. 6B is displayed.

For another example, after the mobile phone detects that the user performs a single-tap operation on the video 601 in the album interface, the GUI shown in FIG. 6B is displayed.

For another example, after the mobile phone detects that the user performs a double-tap operation on the video 601 in the album interface, the GUI shown in FIG. 6B is displayed.

For another example, after the mobile phone detects that the user performs a gesture operation of drawing a circle track on the video 601 in the album interface, the GUI shown in FIG. 6B is displayed. For another example, after the mobile phone detects that the user performs a gesture operation of dragging the video 601 in the album interface, the GUI shown in FIG. 6B is displayed.

Referring to the GUI shown in FIG. 6B, a processing mode in the album interface includes a control 602 used to indicate to set the video 601 as an incoming call video, a control for entering a color retention mode, and a delete control. After detecting that the user taps the control 602, the mobile phone may set the video 601 as an incoming call video.

In an embodiment, at least two SIM cards (for example, a first SIM card and a second SIM card) are installed in the mobile phone. After detecting that the user taps the control 602, the mobile phone may set the video 601 as an incoming call video of the first SIM card and the second SIM card.

In an embodiment, at least two SIM cards (for example, a first SIM card and a second SIM card) are installed in the mobile phone. When the mobile phone detects a preset gesture of the user on the video 601, the processing mode that may be displayed in the album interface includes a control used to indicate to set the video 601 as an incoming call video of the first SIM card, a control used to indicate to set the video 601 as an incoming call video of the second SIM card, a control for entering a color retention mode, and a delete control.

Figure 6C:
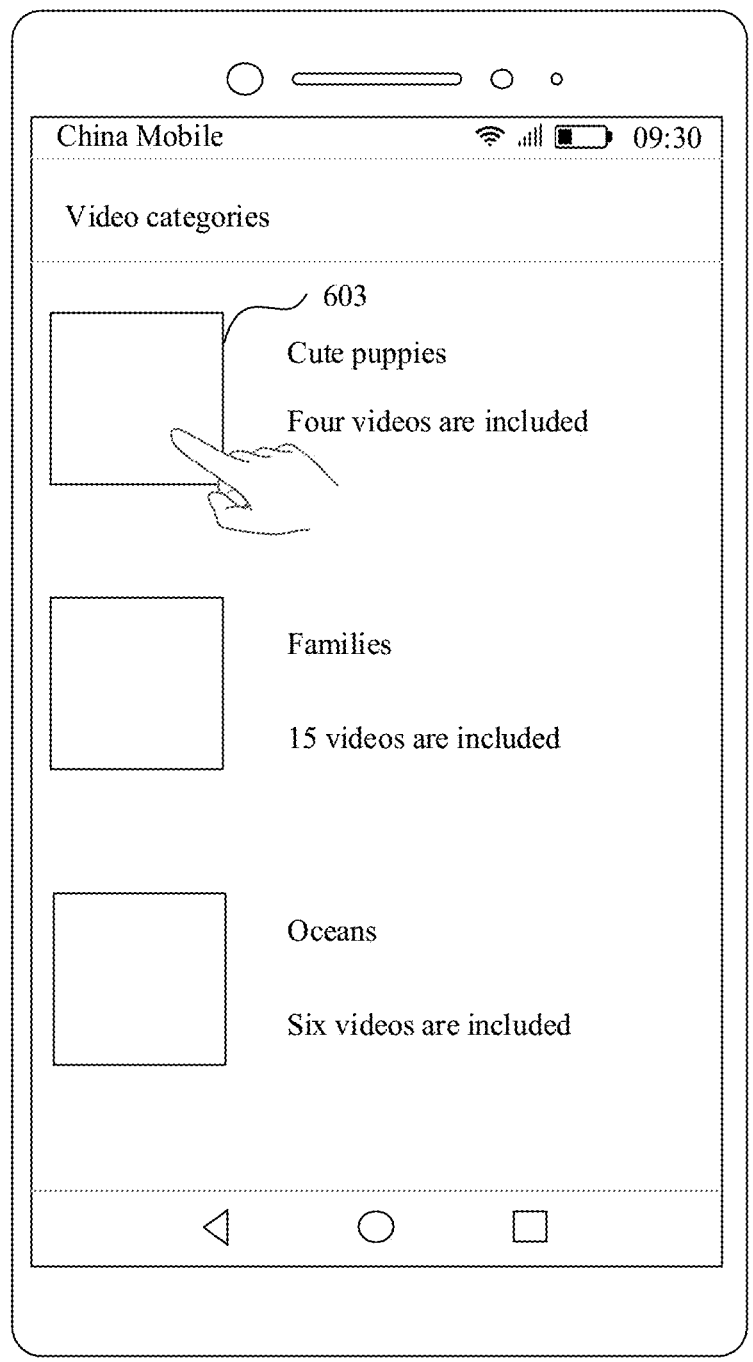

Referring to a GUI shown in FIG. 6C, the mobile phone may further perform intelligent classification on videos that are previously shot or saved. When the user opens an album, the mobile phone may provide intelligently classified categories of the videos for the user. As shown in FIG. 6C, the mobile phone classifies the videos into three categories "cute puppies", "families", and "oceans". The "cute puppies" category includes four videos, the "families" category includes 15 videos, and the "oceans" category includes six videos. After the mobile phone detects that the user performs a preset gesture operation on the "cute puppies" category 603, a GUI shown in FIG. 6D is displayed.

In an embodiment, the intelligent classification of the videos that are previously shot or saved video may also be manually completed by the user.

Figure 6D:
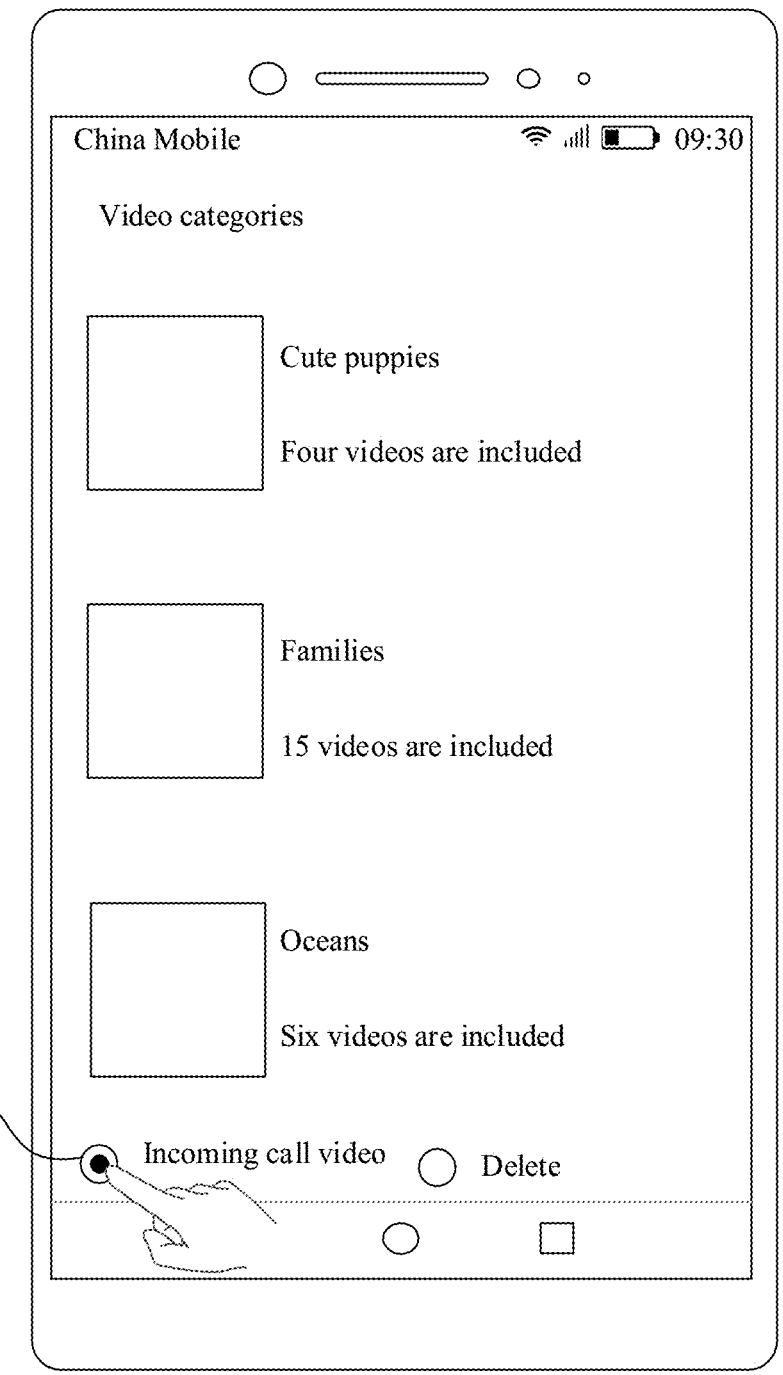

Referring to the GUI shown in FIG. 6D, after detecting that the user taps a control 604, the mobile phone may set the four videos in the "cute puppies" category 603 as incoming call videos.

In an embodiment, at least two SIM cards (for example, a first SIM card and a second SIM card) are installed in the mobile phone. After detecting that the user taps the control 604, the mobile phone may set the four videos in the "cute puppies" category 603 as incoming call videos of the first SIM card and the second SIM card.

In an embodiment, at least two SIM cards (for example, a first SIM card and a second SIM card) are installed in the mobile phone. When the mobile phone detects a preset gesture of the user on the video 601, the processing mode that may be displayed in the album interface includes a control used to indicate to set the four videos in the "cute puppies" category 603 as incoming call videos of the first SIM card, a control used to indicate to set the four videos in the "cute puppies" category 603 as incoming call videos of the second SIM card, a control for entering a color retention mode, and a delete control.

In a possible implementation, the mobile phone may display an incoming call video based on a sequence of storing the four videos in the "cute puppies" category 603, or the mobile phone may randomly select one of the four videos as an incoming call video.

In a possible implementation, the user may further set a definition of an incoming call video or a system has a default definition. After the mobile phone detects that the user taps the control 602, if the definition of the video 601 is higher than a highest definition allowed for the incoming call video, the mobile phone may process the video 601 to reduce the definition of the video 601.

It should be understood that, when the mobile phone detects that the user taps the GUI shown in FIG. 5D to enter local loading, the mobile phone may display the album interface of the mobile phone to select an incoming call video that needs to be loaded.

In a possible implementation, when the user taps the GUI shown in FIG. 5D to enter local loading, the mobile phone may display only locally stored video content. For example, after the mobile phone detects that the user taps "local loading", the GUI shown in FIG. 6C may be displayed, and the user may choose to use a video in the "cute puppies" category 603 as an incoming call video. In this case, the incoming call video of the first SIM card is updated from "Naruto" to "cute puppies".

In a possible implementation, the mobile phone may invoke an interface for setting an incoming call video. In a video playing application, after an operation of the user is detected, a video that the user watches in real time may be set as an incoming call video.

Figure 7A:
FIG. 7A, FIG. 7B, FIG. 7C, and FIG. 7D are a schematic diagram of another group of display interfaces according to an embodiment of this application.

Referring to a GUI shown in FIG. 7A, the GUI is a desktop of a mobile phone. After detecting that a user taps an icon 701 of a video APP on the desktop 301, the mobile phone may start the video APP, and display a GUI shown in FIG. 7B. The video app may be pre-installed on the mobile phone or developed by a third party.

Figure 7B:
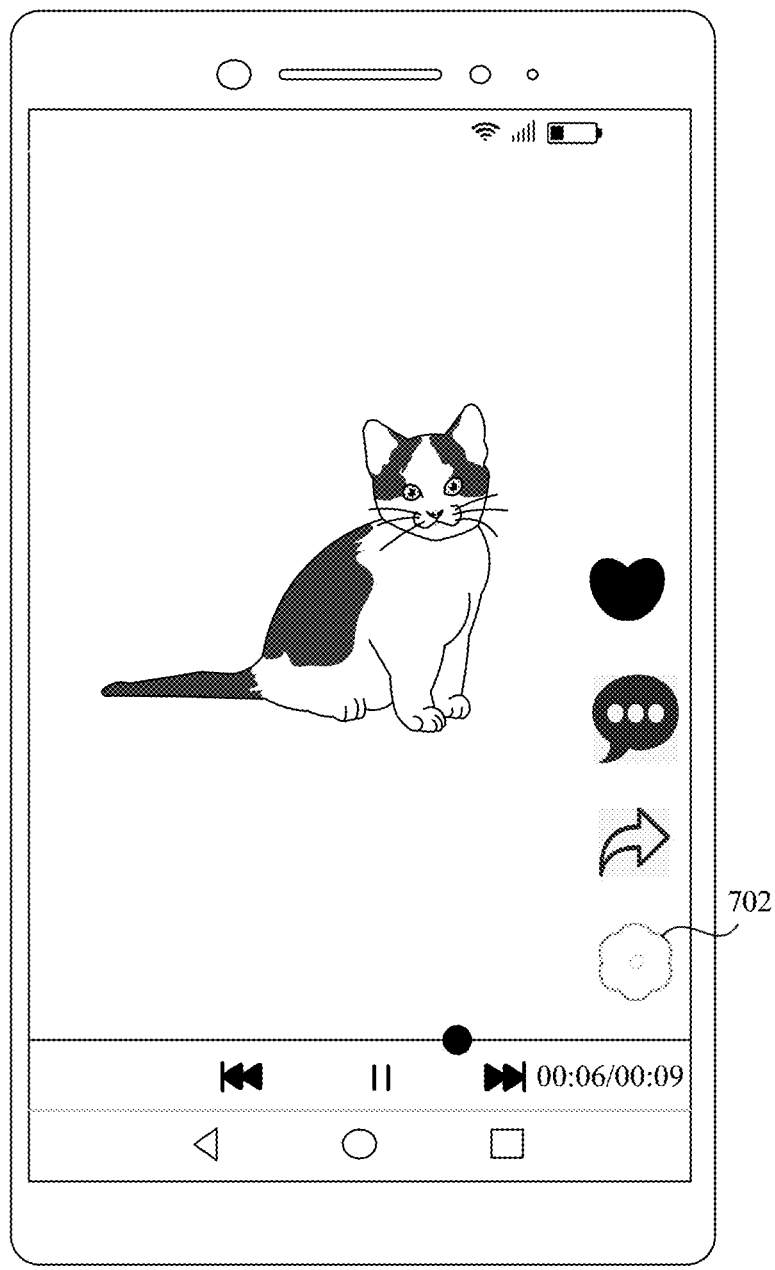

Referring to the GUI shown in FIG. 7B, the user may watch a video in real time by using the video APP. After detecting an operation of sliding upward, sliding downward, sliding leftward, or sliding rightward by the user, the mobile phone may switch video content.

The GUI further includes a like control, a message control, a forwarding control, and a control 702 for setting an incoming call video. The video APP may invoke an interface, in the mobile phone, for setting an incoming call video, and then the control 702 is displayed in the video APP. After the mobile phone detects that the user taps the control 702, a currently watched video can be set as an incoming call video.

According to the method, provided in this embodiment of this application, for presenting a video on an electronic device when there is an incoming call, when the user is watching a video or a video file is being displayed, the user may set the currently watched video or the displayed video file as an incoming call video, so that the user can timely adjust an incoming call video that the user expects to watch. This helps improve user experience.

In an embodiment, if the currently watched video is an offline video, the mobile phone may download the video from a network, and store the video locally in the mobile phone. When there is an incoming call, the mobile phone can obtain the downloaded video locally for playing.

In an embodiment, after detecting that the user taps the control 702, the mobile phone may provide an interface, and the user may select a start time and an end time of a currently played video. For example, duration of the currently played video is 10 minutes, and the user may randomly select a time period in which the user is interested, for example, from 3 minutes and 20 seconds to 3 minutes and 40 seconds. After the user selects the time period in which the user is interested, the mobile phone may capture an original video, and store a video clip in a storage folder of incoming call videos. In an embodiment, after the mobile phone detects that the user taps the control 702, if the mobile phone determines that a definition of a currently played video of "Cat" is higher than a highest definition allowed for an incoming call video, the mobile phone may process the definition of the video of "Cat" to reduce the definition of the video.

In an embodiment, the user may tap, in the video APP, the control 702 for a plurality of pieces of video content, and the mobile phone may store, in an incoming call video folder in the mobile phone, video content for which the control 702 is tapped by the user. When there is an incoming call from another user, the incoming call video may be played based on a sequence in which the user taps the control 702 for the plurality of pieces of video content, or any one of the plurality of pieces of video content may be randomly played.

Figure 7C:
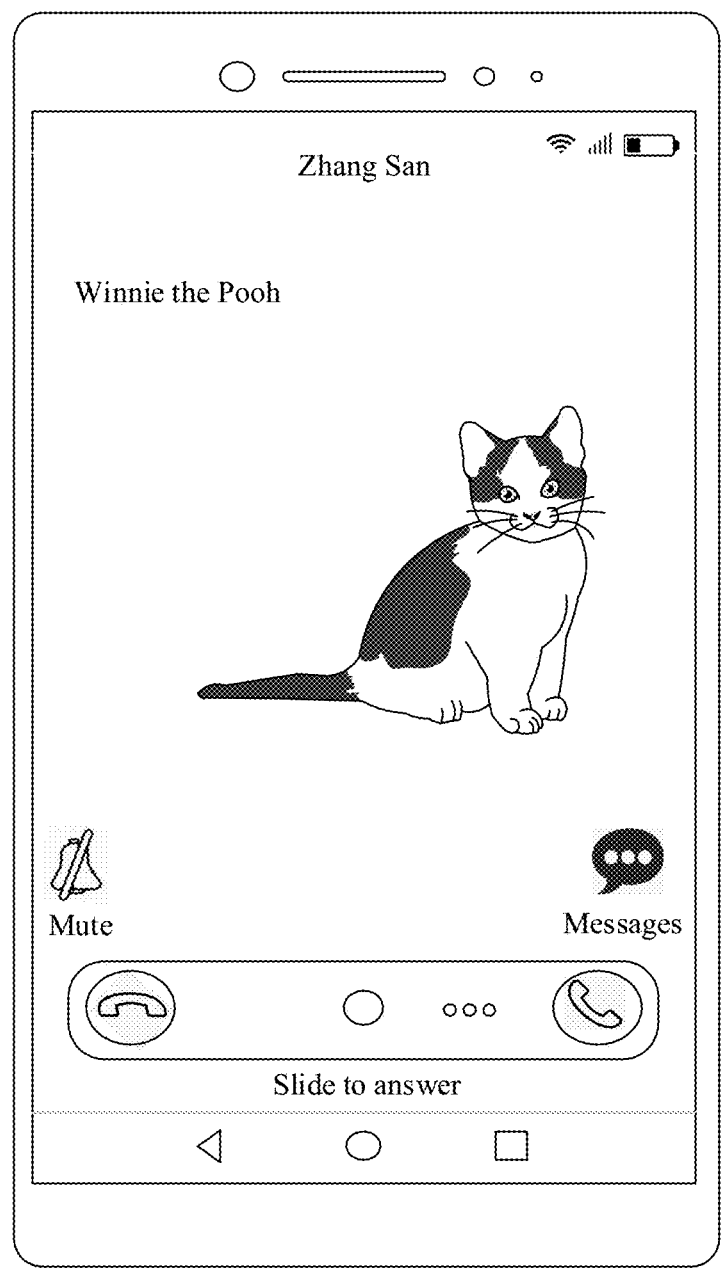

Referring to a GUI shown in FIG. 7C, when there is an incoming call from a user "Zhang San", the incoming call video of the mobile phone is displayed as the video content shown in FIG. 7B, or a part of the video content, captured by the user, shown in FIG. 7B is displayed.

In a possible implementation, the GUI interface further includes a theme name "Cat" of the video.

Figure 7D:
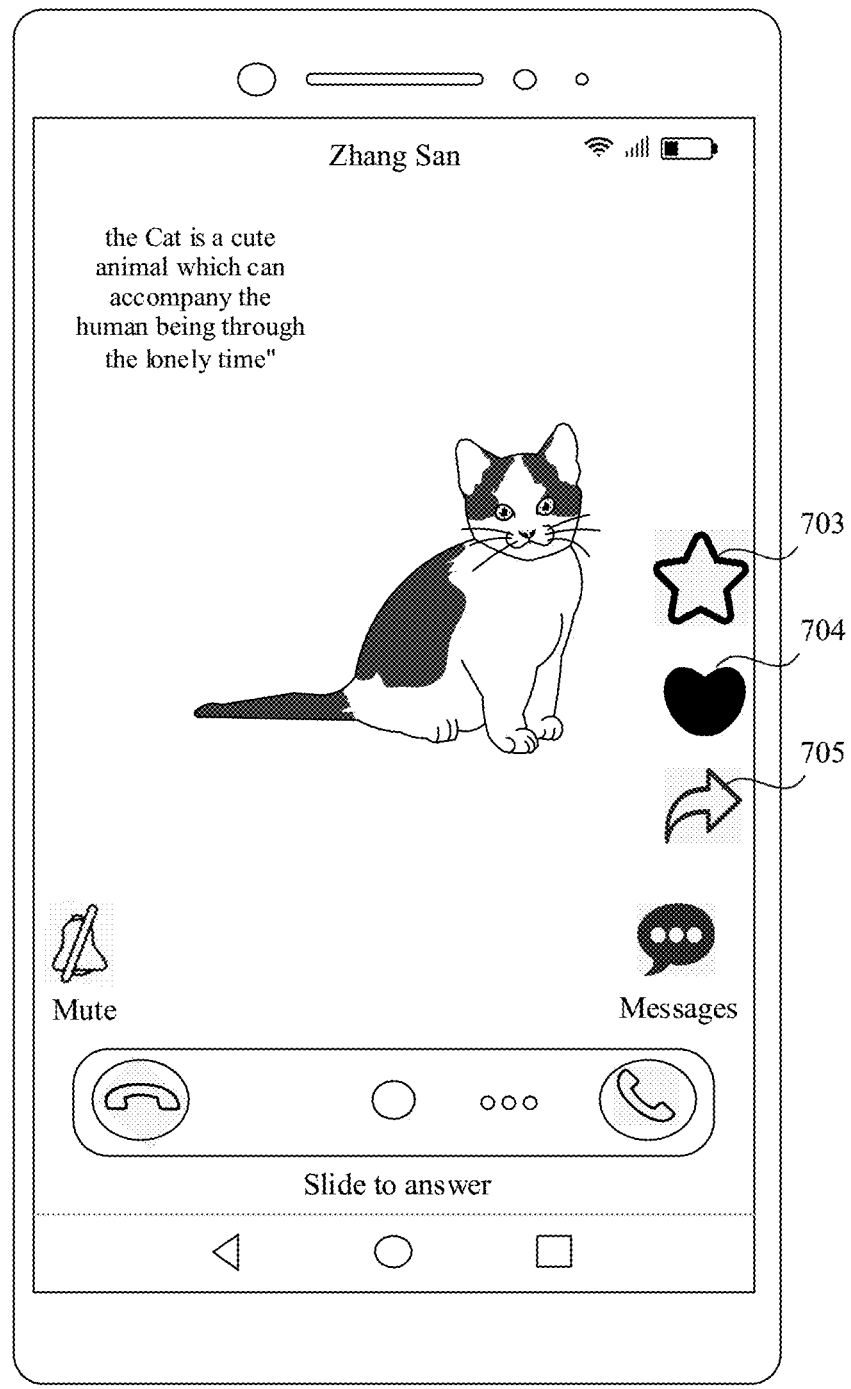

Referring to a GUI shown in FIG. 7D, when there is an incoming call from the user "Zhang San", the incoming call video of the mobile phone is displayed as the video content shown in FIG. 7B, or a part of the video content, captured by the user, shown in FIG. 7B is displayed. The GUI interface further includes an operation interface. The operation interface includes a favorites control 703, a like control 704, a sharing control 705, and more introduction content of the video of "Cat". As shown in FIG. 7D, the introduction content of the video of "Cat" is that "the Cat is a cute animal which can accompany the human being through the lonely time".

It should be understood that, when the mobile phone detects that the user taps the control 703, the mobile phone may determine that a current video is a video liked by the user, and the mobile phone may not delete the video when updating incoming call videos. For example, the mobile phone downloads 10 videos from a server (it is assumed that a maximum quantity of incoming call videos stored in the mobile phone is 10). When there is an incoming call, the mobile phone detects that the user adds two of the videos to favorites. After a period of time, the two videos may not be deleted when the mobile phone updates the incoming call videos, the other eight videos other than the two incoming call videos from the 10 downloaded videos are deleted, and eight new videos are downloaded from the server.

It should be further understood that, after detecting that the user taps the control 704, the mobile phone may send corresponding like data to the server. After collecting statistics, the server may update information in a theme application in real time. For example, after opening the theme application, the user can view incoming call video theme types sorted based on a quantity of likes in descending order.

In an embodiment, when there is an incoming call from another user, the mobile phone may display video content and a theme name corresponding to a video in an incoming call video interface. When the mobile phone detects a preset gesture of the user in the incoming call video interface, or when the mobile phone detects that the user taps a button, the operation interface is displayed, so that the user can perform an operation, for example, adding to favorites, giving likes, or sharing. According to the method for presenting an incoming call video in this embodiment of this application, an application invokes an interface for setting an incoming call video, so that the user can set a liked video as an incoming call video in real time when watching videos. This improves user experience.

In an embodiment, incoming call videos subscribed by the user may be deleted based on a time sequence of storage. For example, a video that has been stored for 10 days is automatically deleted. Alternatively, if a size of videos in the incoming call video folder exceeds a specific capacity (for example, 200 M) or a quantity of the videos exceeds a specific quantity (for example, 20), the videos are deleted in sequence from the longest storage time based on lengths of storage times, until the size of the videos is less than 200 MB or the quantity of the videos is less than 20. However, a video that is used as an incoming call video and is added to favorites by the user may not be deleted.

Figure 8A:
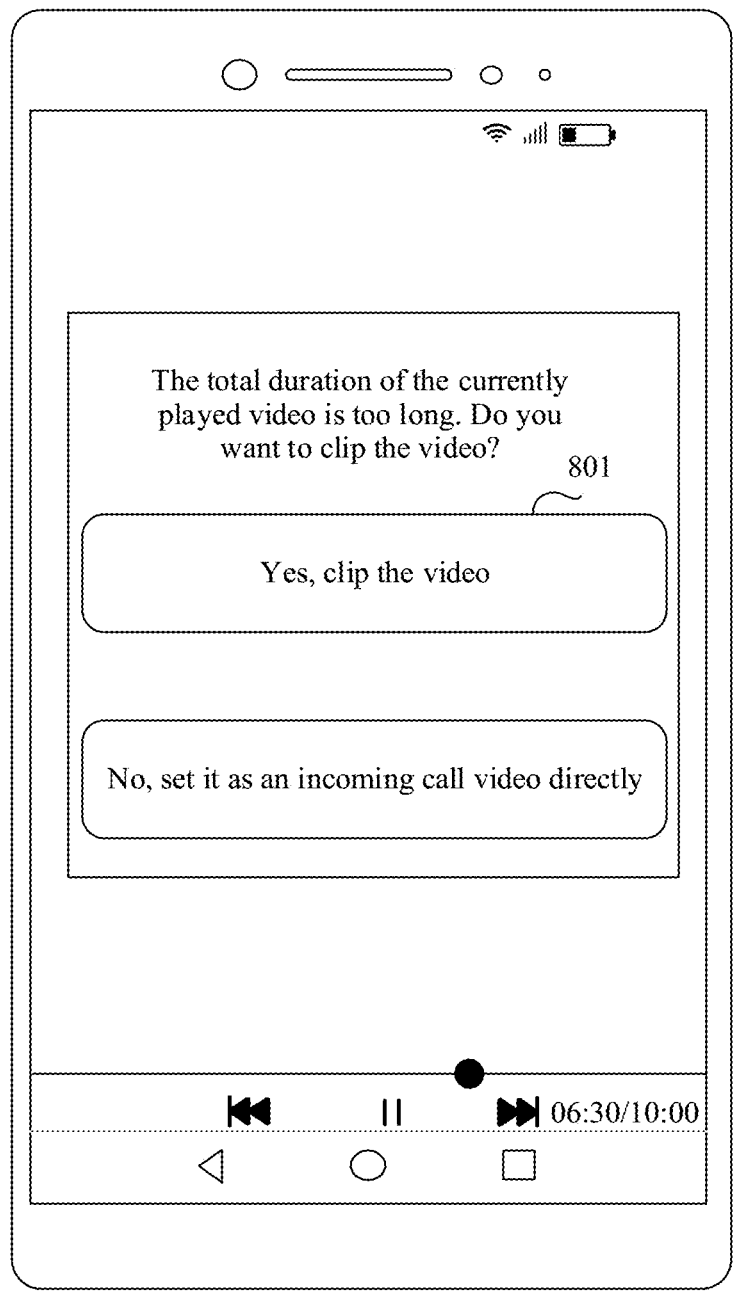
FIG. 8A and FIG. 8B are a schematic diagram of another group of display interfaces according to an embodiment of this application.
Figure 8B:
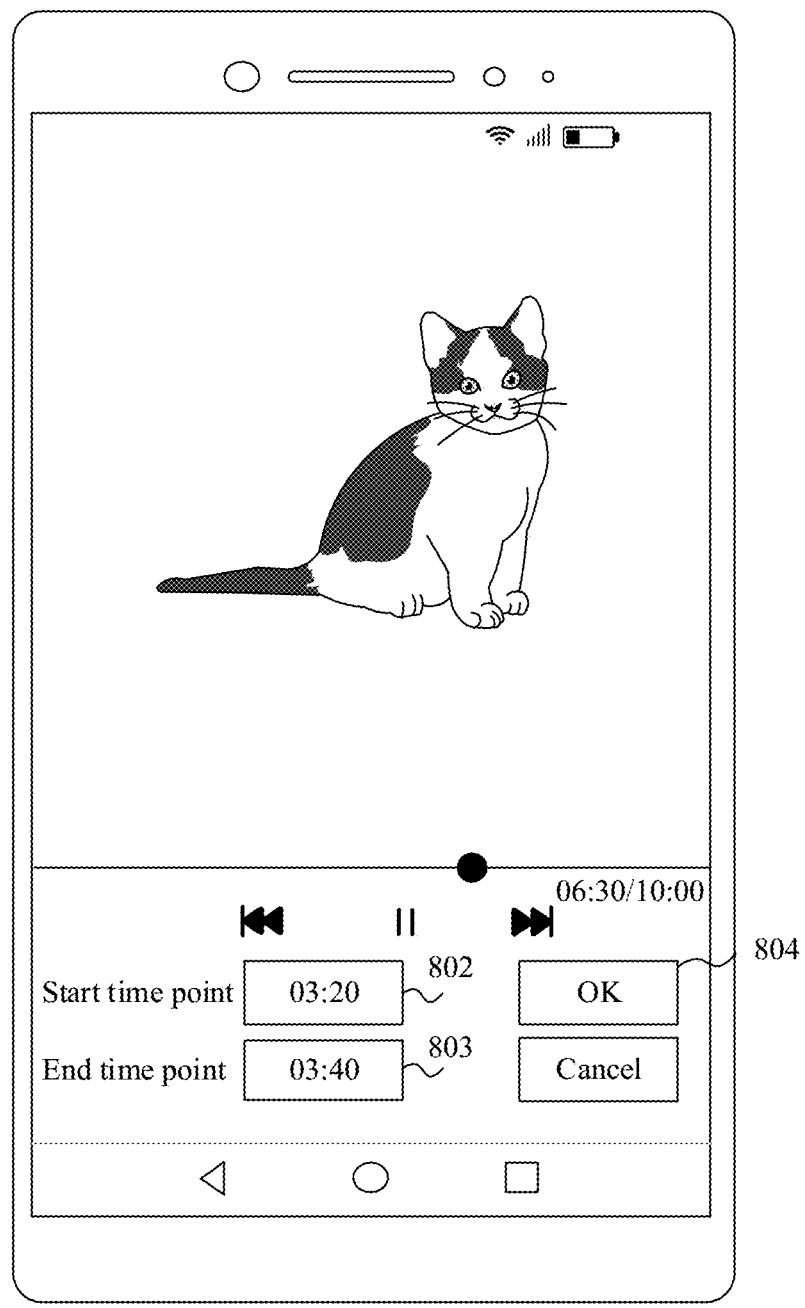

FIG. 8A and FIG. 8B are a schematic diagram of another group of GUIs according to an embodiment of this application. This group of GUIs shows a process of manually capturing a video clip by the user.

For example, total duration of the currently played video in the GUI shown in FIG. 7B is 10 minutes. After detecting that the user taps the control 702, the mobile phone may display a GUI shown in FIG. 8A. Referring to FIG. 8A, the mobile phone may remind the user by using words (or voices) that "The total duration of the currently played video is excessively long. Do you want to clip the video?". After detecting that the user taps a control 801, the mobile phone displays a GUI shown in FIG. 8B.

In a possible implementation, when the duration of the played video is greater than or equal to a first duration threshold (for example, 2 minutes), the GUI shown in FIG. 8A is displayed. When the duration of the played video is less than the first duration threshold, after an operation of tapping the control 702 by the user is detected, the video is directly determined as an incoming call video.

Referring to the GUI shown in FIG. 8B, the user may input a start clipping time point, for example, 000320, of the video to an input box 802, and input an end clipping time point, for example, 000340, of the video in an input box 803. After detecting that the user taps a control 804, the mobile phone determines a video clip (a 20-second video from 3 minutes and 20 seconds to 3 minutes and 40 seconds in the original video) obtained after video clipping as an incoming call video.

According to the method, provided in this embodiment of this application, for presenting a video on an electronic device when there is an incoming call, when the user watches a video or it is shown that duration of a video file is excessively long, the electronic device may remind the user to perform video clipping, so that the user watches a video clip that the user prefers when there is an incoming call. This helps improve user experience.

Figure 9A:
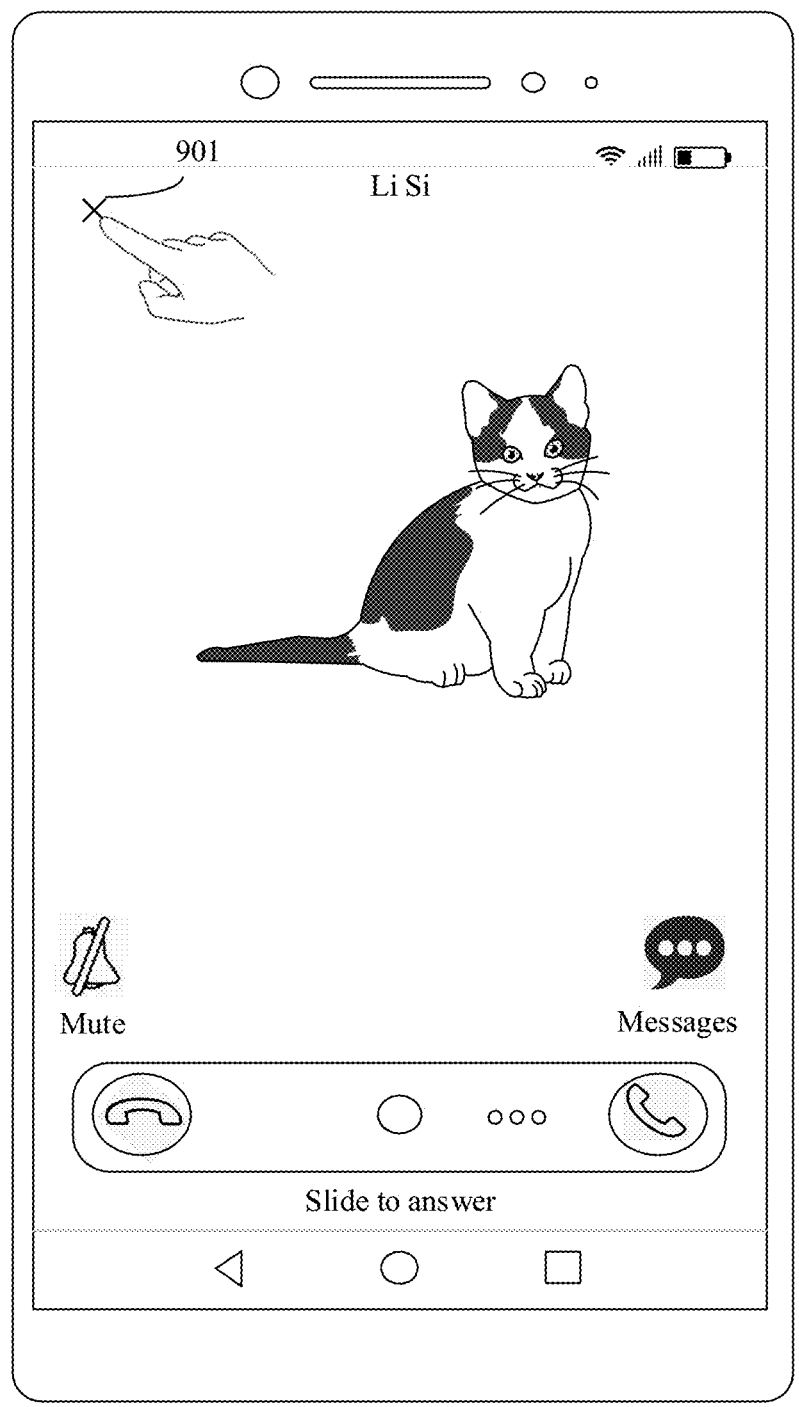
FIG. 9A and FIG. 9B are a schematic diagram of another group of display interfaces according to an embodiment of this application.
Figure 9B:
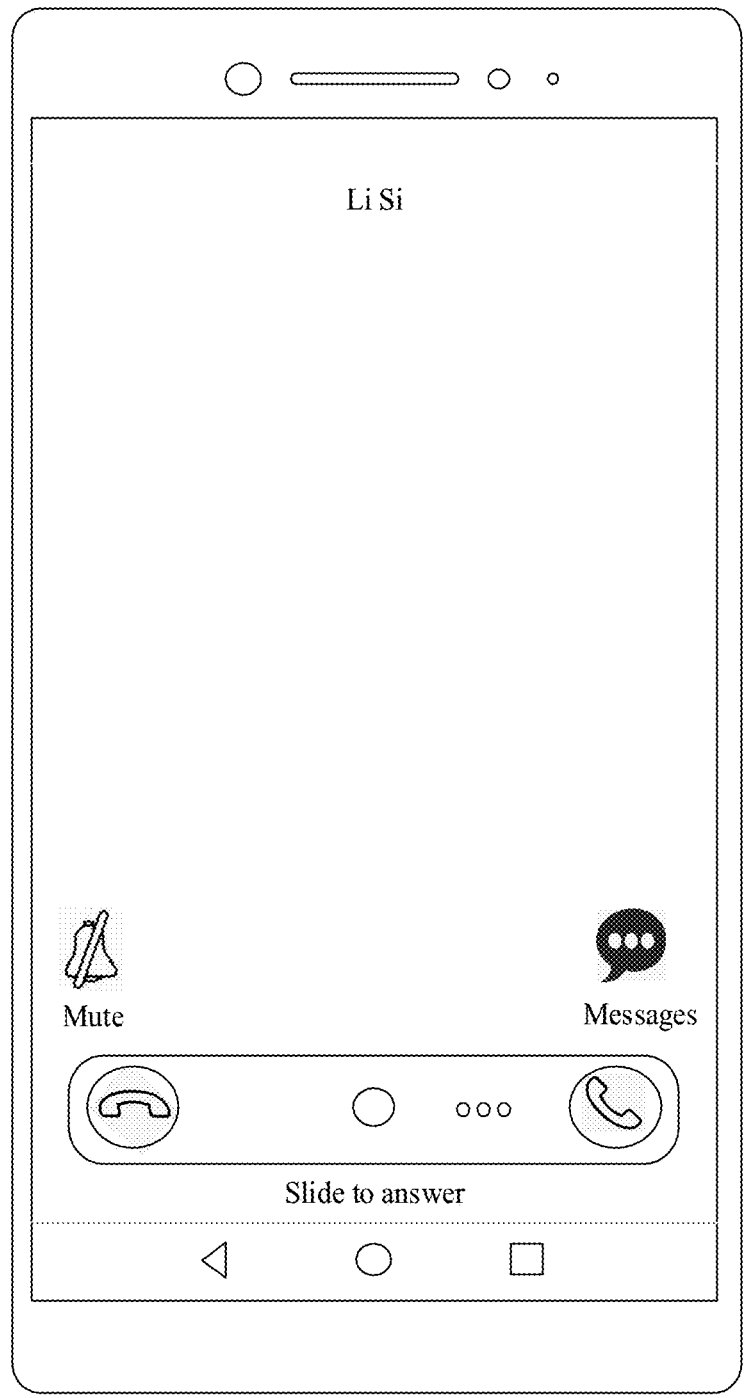

FIG. 9A and FIG. 9B are a schematic diagram of another group of GUIs according to an embodiment of this application.

Referring to a GUI shown in FIG. 9A, when there is an incoming call from a user "Li Si", video content that is previously loaded from a theme application, selected from an album, or selected from a third-party video play application by a user may be displayed in an incoming call video interface. In addition, the incoming call video interface further includes a control 901. After detecting that the user taps the control 901, the mobile phone no longer plays and displays an incoming call video, and displays a GUI shown in FIG. 9B.

Referring to the GUI shown in FIG. 9B, the mobile phone may not display any video content on the incoming call video interface.

Figure 10:
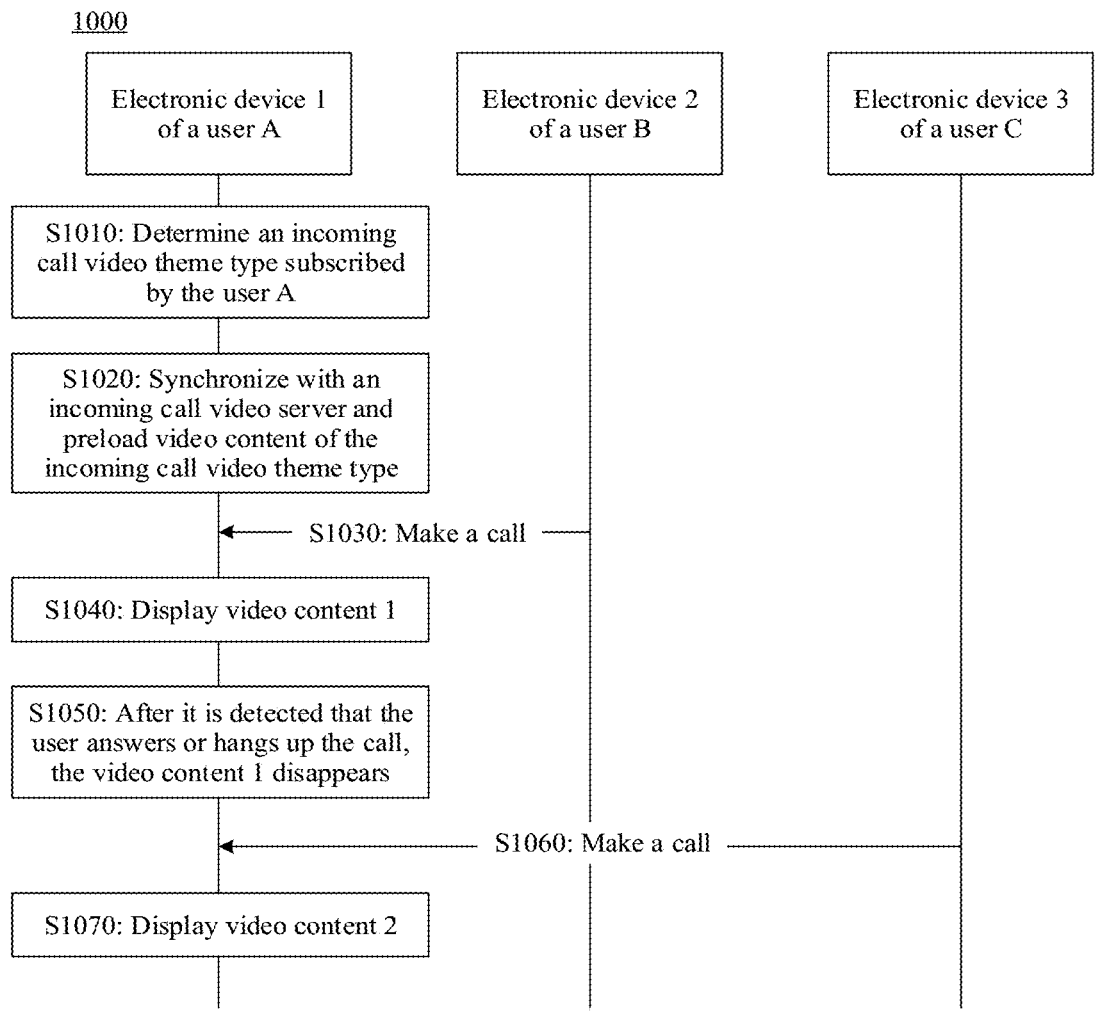
FIG. 10 is a schematic flowchart of a method for presenting a video on an electronic device when there is an incoming call according to an embodiment of this application.

FIG. 10 is a schematic flowchart of a method 1000 for presenting a video on an electronic device when there is an incoming call according to an embodiment of this application. As shown in FIG. 9, the method includes the following steps.

S1010: Detect a first operation, performed by a user A, of tapping a subscribed incoming call video theme type.

S1020: An electronic device 1 synchronizes with an incoming call video server and preloads video content of the incoming call video theme type.

In this embodiment of this application, that the electronic device 1 preloads the incoming call video theme type may also be understood as that the electronic device 1 locally caches the video content of the incoming call video theme type in the electronic device 1, or the electronic device 1 downloads the video content of the incoming call video theme type from the incoming call video server.

S1030: A user B makes a call to the user A by using an electronic device 2.

S1040: Display video content 1 in an incoming call interface of the electronic device 1, where the video content 1 is a piece of video content in the incoming call video theme type.

S1050: After the electronic device 1 detects that the user A answers or hangs up the call, the video content 1 on the electronic device 1 disappears.

S1060: A user C makes a call to the user A by using an electronic device 3.

S1070: Display video content 2 in an incoming call interface of the electronic device 1, where the video content 2 is another piece of video content in the incoming call video theme type.

With reference to the foregoing embodiments and related accompanying drawings, an embodiment of this application provides another schematic flowchart of a method 1100 for presenting a video on an electronic device when there is an incoming call. The method 1100 may be implemented in the electronic device (for example, a mobile phone) that has a screen (for example, a touchscreen) and that is shown in FIG. 1 and FIG. 2. As shown in FIG. 11, the method 1100 may include the following steps.

S1110: The electronic device receives a first incoming call request.

S1120: The electronic device displays a first incoming call display interface on the screen based on the first incoming call request, and plays a first video in the first incoming call display interface.

For example, as shown in FIG. 4A, when there is an incoming call from the user "Wu Xiaofang" at 9:10, the mobile phone displays an incoming call display interface on the touchscreen, and plays the video 2 in the video theme type 5 in the incoming call display interface.

S1130: The electronic device receives a second incoming call request.

S1140: The electronic device displays a second incoming call display interface on the screen based on the second incoming call request, and plays a second video in the second incoming call display interface.

The first incoming call request and the second incoming call request are two call requests consecutively received by the electronic device, and the first video is different from the second video.

According to the method, provided in this embodiment of this application, for presenting a video on an electronic device when there is an incoming call, a user is allowed to select a plurality of incoming call videos, and video content that is different from video content displayed when a previous incoming call is received may be displayed each time an incoming call is received, thereby bringing good experience to the user.

For example, as shown in FIG. 4B, when there is an incoming call from the user "Wu Xiaofang" at 11:15, the mobile phone displays an incoming call display interface on the touchscreen, and plays the video 3 in the video theme type 5 in the incoming call display interface, where incoming call from the user "Wu Xiaofang" at 9:10 and the incoming call from the user "Wu Xiaofang" at 11:15 are two incoming calls consecutively received by the electronic device, and the video 2 and the video 3 are different videos in the video theme type 5.

Optionally, the method 1100 further includes the following.

The electronic device requests a plurality of videos from a server, where the plurality of videos include the first video and the second video, and the electronic device receives the plurality of videos sent by the server.

According to the method, in this embodiment of this application, for presenting a video on an electronic device when there is an incoming call, the user is allowed to select a video theme, the video theme may include a plurality of videos, and video content that is different from video content displayed when a previous incoming call is received may be displayed each time an incoming call is received, thereby bringing good experience to the user.

Optionally, before playing the second video in the second incoming call display interface, the method 1100 further includes the following.

The electronic device automatically determines the second video that needs to be played in the second incoming call display interface.

According to the method, provided in this embodiment of this application, for presenting a video on an electronic device when there is an incoming call, the electronic device can automatically switch video content between two consecutive incoming calls without a manual operation of the user. This helps improve user experience.

For example, as shown in FIG. 3C, after detecting that the user taps the control 305, the mobile phone may request a plurality of videos in the video theme type 5 from the server, and locally store the plurality of videos in the video theme type 5 that are obtained by requesting. When there is an incoming call from the user "Wu Xiaofang" at 11:15, the mobile phone may automatically determine, from the plurality of videos, the video 3 as a video that needs to be played in an incoming call display interface, or the mobile phone may automatically switch the video that needs to be played in the incoming call display interface from the video 2 to the video 3.

For example, a time point at which the mobile phone automatically determines, from the plurality of videos, the video 3 as the video that needs to be played in the incoming call display interface may be a time point at which the mobile phone receives the plurality of videos from the server, and then a sequence of playing the plurality of videos in the incoming call display interface may be determined. Alternatively, the time point at which the mobile phone automatically determines, from the plurality of videos, the video 3 as the video that needs to be played in the incoming call display interface may be a time point at which the mobile phone answers or hangs up the incoming call from the user "Wu Xiaofang" at 9:10, and it may be determined that the video 3 is played in the incoming call display interface next time there is an incoming call from the user. Alternatively, the time point at which the mobile phone automatically determines, from the plurality of videos, the video 3 as the video that needs to be played in the incoming call display interface may be a time point at which the mobile phone receives an incoming call at 11:15, and it may be automatically determined that a video played in the incoming call display interface is the video 3.

Optionally, the method 1100 further includes the following.

The electronic device receives a setting instruction of a user, where the setting instruction is used to specify a range of a video played in an incoming call display interface, and the electronic device determines the first video and the second video based on the range specified by the setting instruction.

In this embodiment of this application, the range of the video played in the incoming call display interface may be videos from which the electronic device selects the video that needs to be played in the incoming call display interface. For example, the range may be a specified storage path, and an incoming call video is selected from videos in the storage path. For example, the range may alternatively be specified label information (or may be referred to as a theme or a type), and an incoming call video is selected from a range of a video having the label information.

According to the method, provided in this embodiment of this application, for presenting a video on an electronic device when there is an incoming call, the electronic device determines the range of the video content played in the incoming call display interface, to help the electronic device timely play a video in the range.

For example, the mobile phone receives a plurality of videos in the video theme type 5 from the server, and stores the plurality of videos in a storage path. Each time the mobile phone receives an incoming call request, the mobile phone may determine, from the plurality of videos in the storage path, a video that needs to be played in the incoming call display interface.

For example, the mobile phone receives a plurality of videos in the video theme type 5 from the server, and labels the plurality of videos with label information "video theme type 5". Each time the mobile phone receives an incoming call request, the mobile phone may determine, from the videos with the label information "video theme type 5", a video that needs to be played in the incoming call display interface.

For example, as shown in FIG. 6D, after detecting that the user taps the control 604, the mobile phone may determine that a range of a video played in the incoming call display interface is the four videos in the "cute puppies" category. Each time the mobile phone receives an incoming call request, the mobile phone can determine, from the four videos in the "cute puppies" category, a video that needs to be played in the incoming call display interface.

Optionally, at least a first subscriber identity module SIM card and a second SIM card may be installed in the electronic device. The configuration instruction includes a first configuration instruction and a second configuration instruction. The first configuration instruction may be used to specify a range of a video played in an incoming call display interface corresponding to an incoming call of the first SIM card. The second configuration instruction may be used to specify a range of a video played in an incoming call display interface corresponding to an incoming call of the second SIM card.

According to the method, provided in this embodiment of this application, for presenting a video on an electronic device when there is an incoming call, different incoming call videos may be set for different subscriber identity module cards. This helps improve user experience when there is an incoming call.

For example, referring to FIG. 5C, after detecting that the user taps the control 503, the mobile phone may load a new video theme type (for example, a video theme type 1) from the theme application, and request a plurality of videos in the video theme type 1 from the server. After the plurality of videos are requested, the mobile phone may store the plurality of videos in a storage path, the plurality of videos in the video theme type 1 are the range of the video played in the incoming call display interface corresponding to the incoming call of the first SIM card.

For example, referring to FIG. 5C, after detecting that the user taps a control corresponding to an incoming call video of the second SIM card, the mobile phone may load a new video theme type (for example, a video theme type 2) from the theme application, and request a plurality of videos in the video theme type 2 from the server. After the plurality of videos are requested, the mobile phone may store the plurality of videos in a storage path, the plurality of videos in the video theme type 2 are the range of the video played in the incoming call display interface corresponding to the incoming call of the second SIM card.

Optionally, at least a first subscriber identity module card and a second subscriber identity module card may be installed in the electronic device.

That the first incoming call request and the second incoming call request are two call requests consecutively received by the electronic device means that the first incoming call request and the second incoming call request are two call requests of the first subscriber identity module card, or that the first incoming call request and the second incoming call request are two call requests consecutively received by the electronic device means that the first incoming call request and the second incoming call request are two consecutive call requests of the second subscriber identity module card.

According to the method, provided in this embodiment of this application, for presenting a video on an electronic device when there is an incoming call, for a same subscriber identity module card, when receiving an incoming call request at different time points, the electronic device may play, in an incoming call display interface, different videos in a same video theme, and for another subscriber identity module card, when receiving an incoming call request at different time points, the electronic device may play, in an incoming call display interface, different videos in another video theme. This helps improve user experience when there is an incoming call.

For example, when an incoming call video of the first SIM card is of the video theme type 1, if the mobile phone consecutively receives two call requests for the first SIM card, the mobile phone may respectively display a video 5 and a video 6 in the video theme type 1 in two incoming call display interfaces.

For example, when an incoming call video of the second SIM card is of the video theme type 2, if the mobile phone consecutively receives two call requests for the second SIM card, the mobile phone may respectively display a video 7 and a video 8 in the video theme type 2 in two incoming call display interfaces.

It should be understood that, in this embodiment of this application, two consecutive incoming calls may not be distinguished between the two SIM cards. In other words, a first incoming call request is an incoming call request for the first SIM card, and a next incoming call request following the first incoming call request is an incoming call request for the second SIM card. For the incoming call request of the first SIM card, the video 5 in the video theme type 1 may be played in the incoming call display interface. For the incoming call request of the second SIM card, the video 7 in the video theme type 2 may be played in the incoming call display interface.

Optionally, before receiving the first incoming call request, the method 1100 further includes, when the first video is played or a file of the first video is displayed, detecting a first operation of the user, and setting, in response to the first operation, the first video as a candidate video to be played in an incoming call display interface.

According to the method, provided in this embodiment of this application, for presenting a video on an electronic device when there is an incoming call, when the user is watching a video or a video file is being displayed, the user may set the currently watched video or the displayed video file as an incoming call video, so that the user can timely adjust an incoming call video that the user expects to watch. This helps improve user experience.

For example, referring to FIG. 7B, after detecting that the user taps the control 702, the mobile phone may set the currently played video as the candidate video played in the incoming call display interface.

For example, a playback interface of the video of "Cat" shown in FIG. 7B is a video playback interface in a third-party APP. When the mobile phone is connected to a cellular network or a wireless local area network, the video may be watched online. After detecting that the user taps the control 702, the mobile phone may request the video of "Cat" from a corresponding server, and store the video in a storage path of the mobile phone. Videos in the storage path are candidate videos to be played in an incoming call display interface of the mobile phone.

For example, referring to FIG. 6D, when the user browses an album, the mobile phone may display classification information of a plurality of videos, and after detecting that the user taps the control 604, the mobile phone may use the four videos in the "cute puppies" category as candidate videos to be played in an incoming call display interface of the mobile phone.

Optionally, before receiving the first incoming call request, the method 1100 further includes, when a third video is played or a file of the third video is displayed, detecting a first operation of the user, displaying a setting interface for the third video in response to the first operation, detecting a selection operation of the user, where the selection operation is used to select a partial video clip in the third video, and determining the partial video clip in the third video as the first video based on the selection operation, and setting the first video as a candidate video to be played in an incoming call display interface.

According to the method, provided in this embodiment of this application, for presenting a video on an electronic device when there is an incoming call, when the user watches a video or it is shown that duration of a video file is excessively long, the electronic device may remind the user to perform video clipping, so that the user watches a video clip that the user prefers when there is an incoming call. This helps improve user experience.

For example, referring to FIG. 8A, the first operation may be an operation of tapping the control 801 by the user. After detecting the operation of tapping the control 801 by the user, the mobile phone displays a video clip interface for the video of "Cat". The selection operation may be an operation of tapping the control 804 by the user. After detecting the operation of tapping the control 804 by the user, the mobile phone may determine the video clip from 3 minutes and 20 seconds to 3 minutes and 40 seconds in the original video as a candidate video to be played in an incoming call display interface of the mobile phone.

It should be understood that, after completing video clipping of the original video, the mobile phone may store the video clip obtained after the video clipping in a storage path, or store the video clip in an album.

Optionally, before the electronic device receives the first incoming call request, the method 1100 further includes adjusting definition of the first video.

According to the method, provided in this embodiment of this application, for presenting a video on an electronic device when there is an incoming call, when definition of a video selected by the user does not meet a definition requirement of playing a video in an incoming call display interface, the electronic device may automatically update the definition of the video, so that the user can timely watch a video that the user likes when there is an incoming call. This helps improve user experience.

For example, referring to FIG. 6B, after detecting an operation of tapping the control 602 by the user, the mobile phone may determine the video 601 as a candidate video to be played in an incoming call display interface of the mobile phone. In this case, the mobile phone may further determine definition of the video 601. For example, if the definition of the video 601 is ultra-high definition, but the definition of a video supported by the incoming call display interface is high definition or a definition lower than high definition, the mobile phone may further automatically adjust the definition of the video 601, for example, adjust the definition of the video 601 from ultra-high definition to high definition.

Optionally, when the electronic device plays the first video in the first incoming call display interface, the method further includes detecting a second operation of the user, and displaying a first control in the first incoming call display interface in response to the second operation, where the first control is used by the user to add the first video to favorites, give a like to the first video, or forward the first video.

For example, referring to FIG. 7D, the incoming call display interface includes the control 703, the control 704, and the control 705. Alternatively, the incoming call display interface includes some controls of the control 703, the control 704, and the control 705.

For a function of each control, refer to the description in the foregoing embodiment. For brevity, details are not described herein again.

Optionally, when the electronic device detects that the user triggers an answering UI control or a hang-up UI control, video content in an incoming call display interface automatically disappears.

It may be understood that, to implement the foregoing functions, the electronic device includes corresponding hardware and/or software modules for performing the functions. With reference to the steps of each example described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of the embodiments of this application.

In the embodiments, the electronic device may be divided into function modules based on the example in the foregoing method. For example, each function module corresponding to each function may be obtained through division, or two or more functions may be integrated into one processing module. The integrated module may be implemented in a form of hardware. It should be noted that, in this embodiment, module division is an example, and is merely a logical function division. In actual implementation, another division manner may be used.

When the function modules are obtained through division by using corresponding functions, FIG. 12 is a schematic diagram of possible composition of an electronic device 1200 according to the foregoing embodiments. As shown in FIG. 12, the electronic device 1200 may include a detection unit 1210, a display unit 1220, and a playing unit 1230.

The detection unit 1210 may be configured to support the electronic device 1200 in performing the step 1110, the step 1130, and the like, and/or another process used for the technology described in this specification.

The display unit 1220 may be configured to support the electronic device 1200 in performing display operations in related incoming call display interfaces, and the like, in the step 1120 and the step 1140, and/or another process used for the technology described in this specification.

The playing unit 1230 may be configured to support the electronic device 1200 in performing related video playing operations, and the like, in the step 1120 and the step 1140, and/or another process used for the technology described in this specification.

It should be noted that all related content of the steps in the foregoing method embodiments may be cited in function descriptions of corresponding function modules. Details are not described herein again.

The electronic device provided in this embodiment is configured to perform the foregoing method for presenting a video on an electronic device when there is an incoming call. Therefore, an effect same as the effect of the foregoing implementation methods can be achieved.

When an integrated unit is used, the electronic device may include a processing unit, a storage unit, and a communications unit block. The processing unit block may be configured to control and manage actions of the electronic device, for example, may be configured to support the electronic device in performing the steps performed by the detection unit 1210, the display unit 1220, and the playing unit 1230. The storage unit may be configured to support the electronic device in storing program code, data, and the like. The communications module may be configured to support communication between the electronic device and another device.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processing (DSP) and a microprocessor. The storage module may be a memory. The communications module may be a device, for example, a radio frequency circuit, a BLUETOOTH chip, or a Wi-Fi chip, that interacts with another electronic device.

In an embodiment, when the processing module is a processor and the storage module is a memory, the electronic device in this embodiment may be a device having the structure shown in FIG. 1.

An embodiment further provides a computer storage medium. The computer storage medium stores computer instructions. When the computer instructions are run on an electronic device, the electronic device is enabled to perform the foregoing related method steps, to implement the method for presenting a video on an electronic device when there is an incoming call in the foregoing embodiments.

An embodiment further provides a computer program product. When the computer program product runs on a computer, the computer is enabled to perform the foregoing related steps, to implement the method for presenting a video on an electronic device when there is an incoming call in the foregoing embodiments.

In addition, an embodiment of this application further provides an apparatus. The apparatus may be further a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the method for presenting a video on an electronic device when there is an incoming call in the foregoing embodiments.

The electronic device, the computer storage medium, the computer program product, or the chip provided in the embodiments is configured to perform the corresponding method provided above. Therefore, for beneficial effects that can be achieved, refer to the beneficial effects in the corresponding method provided above. Details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by an electronic device, comprising:
receiving a first operation to set a first video as a first incoming call video of a first subscriber identity module (SIM) card, wherein the first video is stored in the electronic device;

displaying first prompt information to instruct a user to clip the first video to produce a clipped first video when a first duration of the first video is greater than a duration threshold;
setting the clipped first video as the first incoming video call of the first SIM card;
receiving a second operation to set a second video as a second incoming call video of a second SIM card, wherein the second video is stored in the electronic device;
setting the second video as the second incoming call video of the second SIM card without clipping the second video when a second duration of the second video is less than the duration threshold;
receiving a first incoming call request for the first SIM card of the electronic device;
displaying, in response to the first incoming call request, a first incoming call display interface on a screen of the electronic device;
playing, in response to the first incoming call request, the clipped first video in the first incoming call display interface;
receiving a second incoming call request for the second SIM card of the electronic device;
displaying, in response to the second incoming call request, a second incoming call display interface on the screen;
playing, in response to the second incoming call request, the second video in the second incoming call display interface, wherein the clipped first video is different from the second video;
displaying, in each of the first incoming call display interface or the second incoming call display interface, an answering user interface (UI) control and a hang-up UI control;
answering the first incoming call request or the second incoming call request when the answering UI control is triggered; and
hanging up the first incoming call request or the second incoming call request when the hang-up UI control is triggered.

2. The method of claim 1, wherein the clipped first video is produced using a start time and an end time to determine the clipped first video.

3. The method of claim 1, wherein the first incoming call display interface or the second incoming call display interface comprises message controls.

4. The method of claim 1, wherein a first theme of the first video is different from a second theme of the second video.

5. The method of claim 1, wherein the first duration of the first video is greater than a third duration of the clipped first video.

6. The method of claim 1, wherein the second operation comprises receiving, from the user, a first time to use as a start time of the clipped first video and a second time to use as an end time of the clipped first video.

7. The method of claim 1, wherein the duration threshold comprises two minutes.

8. An electronic device comprising:
a screen;
a first subscriber identity module (SIM) card;
a second SIM card; and
a processor coupled to the screen, the first SIM card, and the second SIM card and configured to:
receive a first operation to set a first video as a first incoming call video of the first SIM card, wherein the first video is stored in the electronic device;
display first prompt information to instruct a user to clip the first video to produce a clipped first video when a first duration of the first video is greater than a duration threshold;
set the clipped first video as the first incoming video call of the first SIM card;
receive a second operation to set a second video as a second incoming call video of the second SIM card, wherein the second video is stored in the electronic device;
set the second video as the second incoming call video of the second SIM card without clipping the second video when a second duration of the second video is less than the duration threshold;
receive a first incoming call request for the first SIM card;
display, in response to the first incoming call request, a first incoming call display interface on the screen;
play, in response to the first incoming call request, the clipped first video in the first incoming call display interface;
receive a second incoming call request for the second SIM card;
display, in response to the second incoming call request, a second incoming call display interface on the screen;
play, in response to the second incoming call request, the second video in the second incoming call display interface, wherein the clipped first video is different from the second video;
display, in each of the first incoming call display interface or the and the second incoming call display interface, an answering user interface (UI) control and a hang-up UI control;
answer the first incoming call request or the second incoming call request when the answering UI control is being triggered; and
hang up the first incoming call request or the second incoming call request when the hang-up UI control is being triggered.

9. The electronic device of claim 8, wherein the clipped first video is produced by using a start time and an end time to determine the clipped first video.

10. The electronic device of claim 8, wherein the first incoming call display interface or the and the second incoming call display interface comprises message controls.

11. The electronic device of claim 8, wherein a first theme of the first video is different from a second theme of the second video.

12. The electronic device of claim 8, wherein the first duration of the first video is greater than a third duration of the clipped first video.

13. The electronic device of claim 8, wherein the second operation comprises receiving, from the user, a first time to use as a start time of the clipped first video and a second time to use as an end time of the clipped first video.

14. The electronic device of claim 8, wherein the duration threshold comprises two minutes.

15. A computer program product comprising computer-executable instructions stored on a non-transitory computer-readable medium that, when executed by a processor, cause an electronic device to:
receive a first operation to set a first video as a first incoming call video of a first subscriber identity module (SIM) card, wherein the first video is stored in the electronic device;

display first prompt information to instruct a user to clip the first video to produce a clipped first video when a first duration of the first video is greater than a duration threshold;
set the clipped first video as the first incoming video call of the first SIM card;
receive a second operation to set a second video as a second incoming call video of a second SIM card, wherein the second video is stored in the electronic device;
set the second video as the second incoming call video of the second SIM card without clipping the second video when a second duration of the second video is less than the duration threshold;
receive a first incoming call request for the first SIM card of the electronic device;
display, in response to the first incoming call request, a first incoming call display interface on a screen of the electronic device;
play, in response to the first incoming call request, the clipped first video in the first incoming call display interface;
receive a second incoming call request for the second SIM card of the electronic device;
display, in response to the second incoming call request, a second incoming call display interface on the screen;
play, in response to the second incoming call request, the second video in the second incoming call display interface, wherein the clipped first video is different from the second video;
display, in each of the first incoming call display interface or the second incoming call display interface, an answering user interface (UI) control and a hang-up UI control;
answer the first incoming call request or the second incoming call request when the answering UI control is being triggered; and
hang up the first incoming call request or the second incoming call request when the hang-up UI control is being triggered.

16. The computer program product of claim 15, wherein the clipped first video is produced using a start time and an end time to determine the clipped first video.

17. The computer program product of claim 15, wherein the first incoming call display interface or the second incoming call display interface comprises message controls.

18. The computer program product of claim 15, wherein the first duration of the first video is greater than a third duration of the clipped first video.

19. The computer program product of claim 15, wherein the second operation comprises receiving, from the user, a first time to use as a start time of the clipped first video and a second time to use as an end time of the clipped first video.

20. The computer program product of claim 15, wherein the duration threshold comprises two minutes.

* * * * *